United States Patent
Mukhin et al.

(10) Patent No.: US 9,043,368 B2
(45) Date of Patent: *May 26, 2015

(54) INTERFACING AN R LANGUAGE CLIENT ENVIRONMENT WITH A DATABASE ENGINE

(75) Inventors: Denis B. Mukhin, Marlborough, MA (US); Vaishnavi Sashikanth, Redwood City, CA (US); Mark F. Hornick, Andover, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 140 days.

This patent is subject to a terminal disclaimer.

(21) Appl. No.: 13/434,479

(22) Filed: Mar. 29, 2012

(65) Prior Publication Data

US 2013/0262524 A1    Oct. 3, 2013

(51) Int. Cl.
G06F 17/30    (2006.01)
G06F 7/00    (2006.01)

(52) U.S. Cl.
CPC ...... *G06F 17/30289* (2013.01); *G06F 17/3056* (2013.01)

(58) Field of Classification Search
None
See application file for complete search history.

(56) References Cited

U.S. PATENT DOCUMENTS

| | | | |
|---|---|---|---|
| 7,870,575 B2 * | 1/2011 | Spio | 725/28 |
| 7,892,740 B2 * | 2/2011 | Weichselbaum et al. | 435/6.14 |
| 2004/0019901 A1 * | 1/2004 | Spio | 725/25 |
| 2009/0011439 A1 * | 1/2009 | Weichselbaum et al. | 435/7.23 |
| 2010/0153963 A1 | 6/2010 | Kakarlamudi et al. | |
| 2011/0200998 A1 * | 8/2011 | Weichselbaum et al. | 435/6.11 |
| 2012/0239677 A1 | 9/2012 | Neale | |

OTHER PUBLICATIONS

"The R Project for Statistical Computing" Feb. 6, 2011 url: http://www.r-project.org/.
Dendek et al., "Massively parallel analytics for large datasets in R with nza package", Netezza, Aug. 4, 2010, 21 pages.
Teradata Aster, White Paper, "Aster Data nCluster In—database Analytics with R" 2011, 6 pages.
(Continued)

*Primary Examiner* — Dung K Chau
(74) *Attorney, Agent, or Firm* — Vista IP Law Group, LLP

(57) ABSTRACT

A method, system, and computer program product for interfacing an R language client with a separate database engine environment. The method commences by interpreting an R language code fragment to identify and select R language constructs and transforming the R language constructs into queries or other database language constructs to execute within the database engine environment. The method further implements techniques for transmitting marshalled results (resulting from the execution of the database language constructs) back to the R client environment. In some situations, the marshalled results include an XML schema or DTD or another metadata description of the structure of the results. User conveniences in the form of transparent database query construction, and transparent exploitation of parallelism is achieved by determining the computation resource requirements of executable language constructs, and mapping the execution to one (or more) of, a local R client, a database engine, or a remote execution engine.

40 Claims, 19 Drawing Sheets

(56) References Cited

OTHER PUBLICATIONS

Zhang, et al., "RIOT:I/O-Efficient Numerical Computing without SQL", 4th Biennial Conference on Innovative Data Systems Research (CIDR), Jan. 4-7, 2009, Asilomar, California, USA, 10 pages.

Non-final Office Action dated Oct. 23, 2013 for U.S. Appl. No. 13/434,563, 11 pages.

"A Common Database Interface", Aug. 26, 2002, R-databases Special Interest Group, pp. 1-13.

Final Office Action dated Jun. 6, 2014, for U.S. Appl. No. 13/434,563.

* cited by examiner

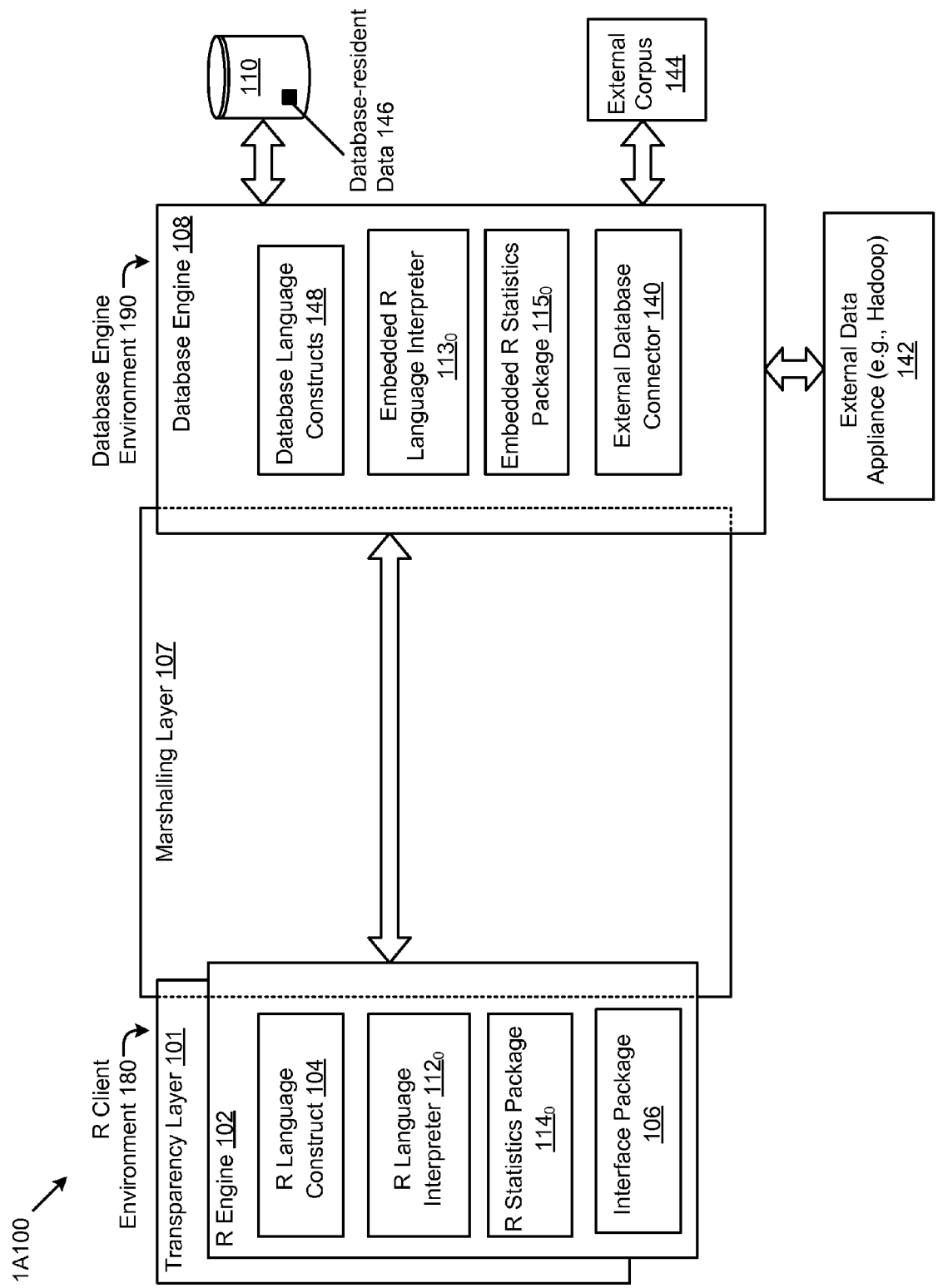
FIG. 1A1

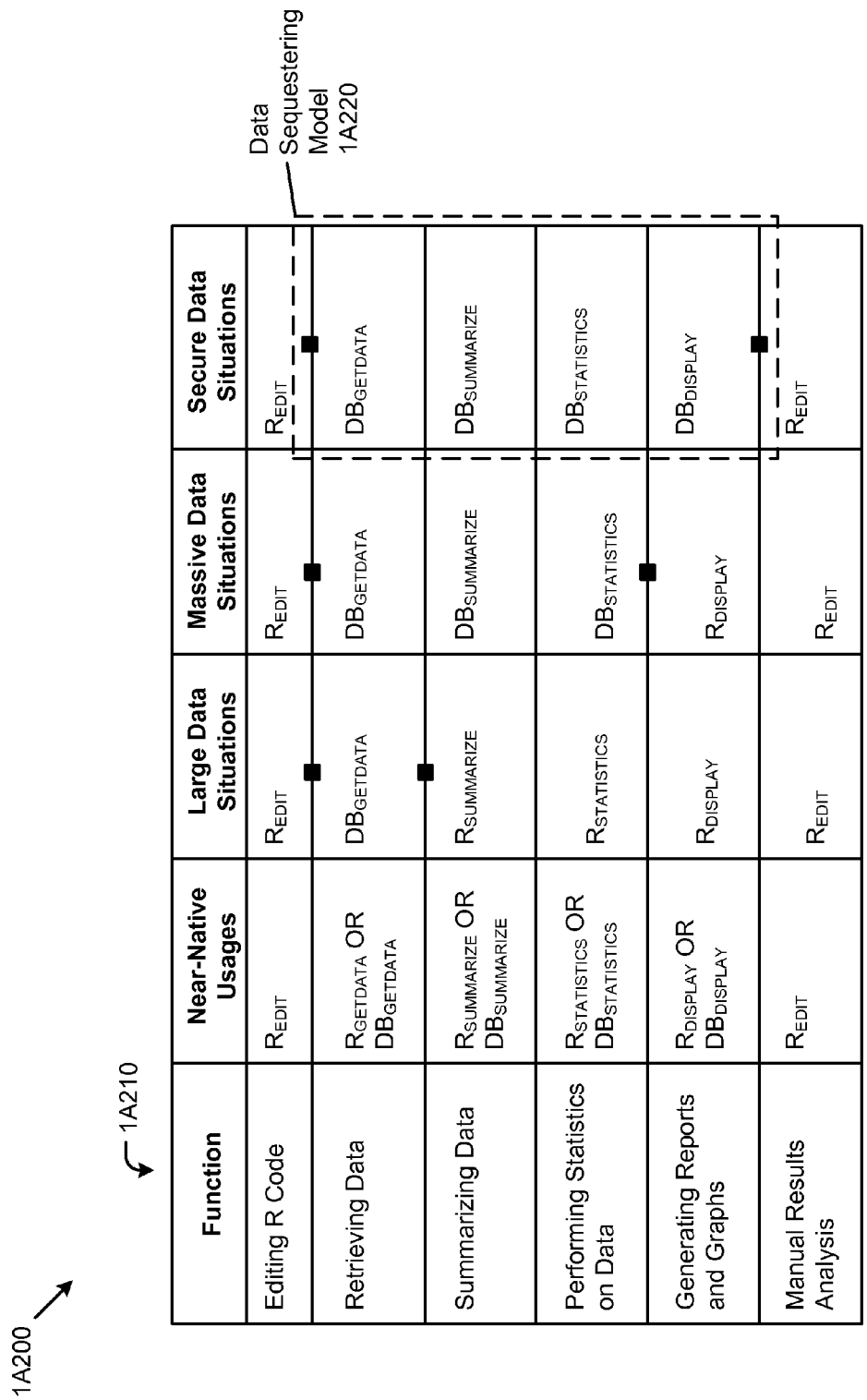
FIG. 1A2

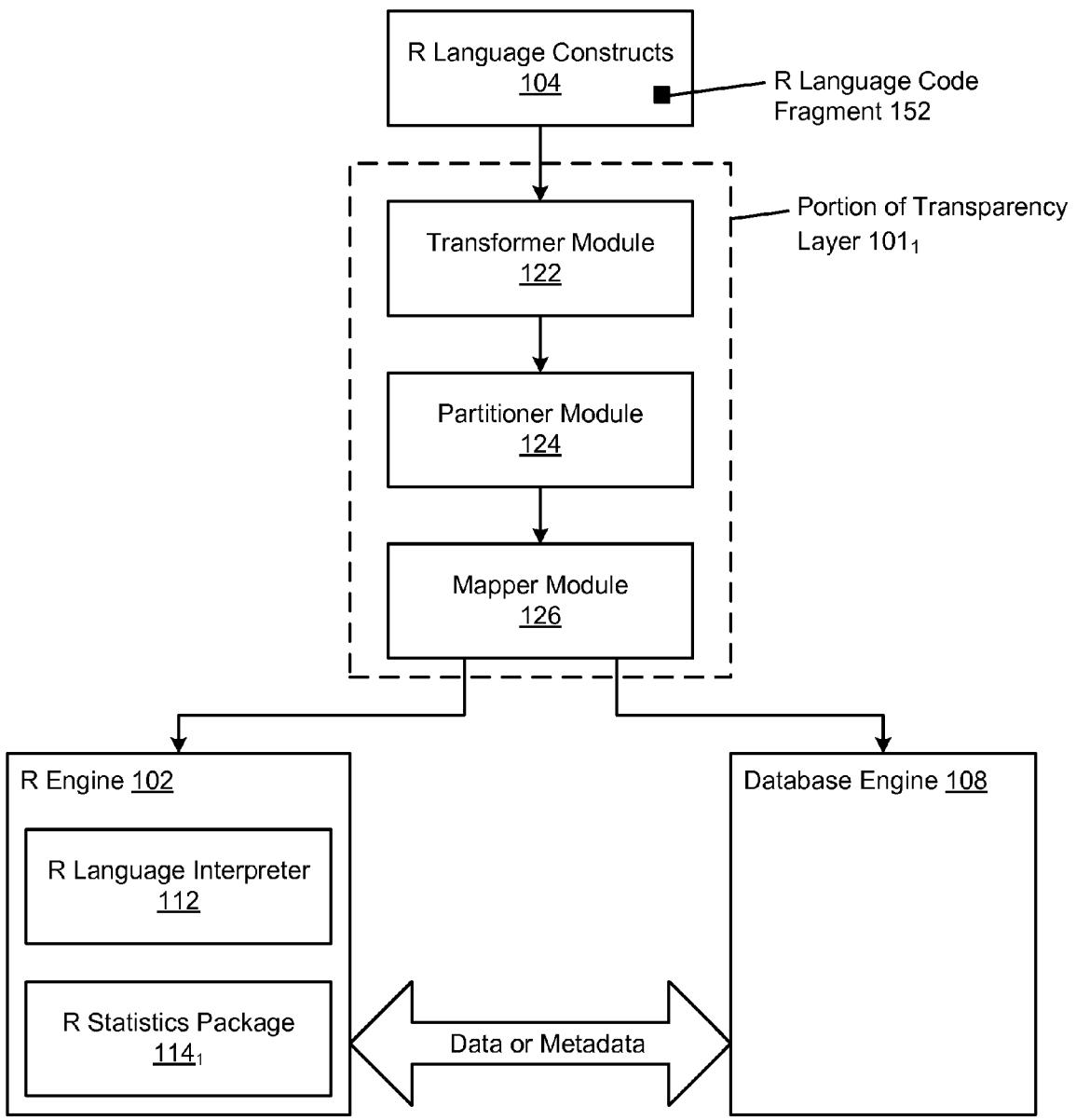
FIG. 1B1

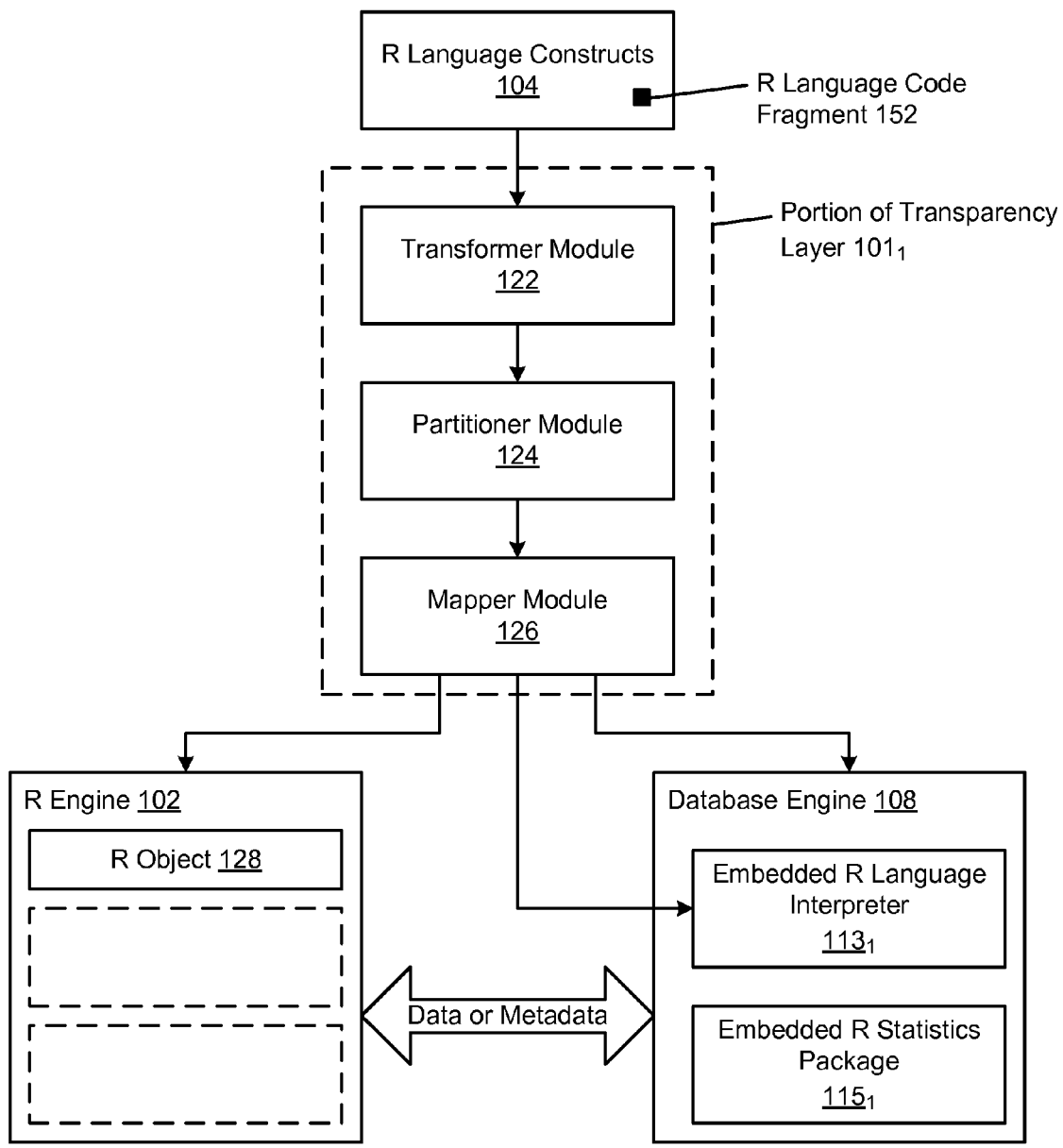
FIG. 1B2

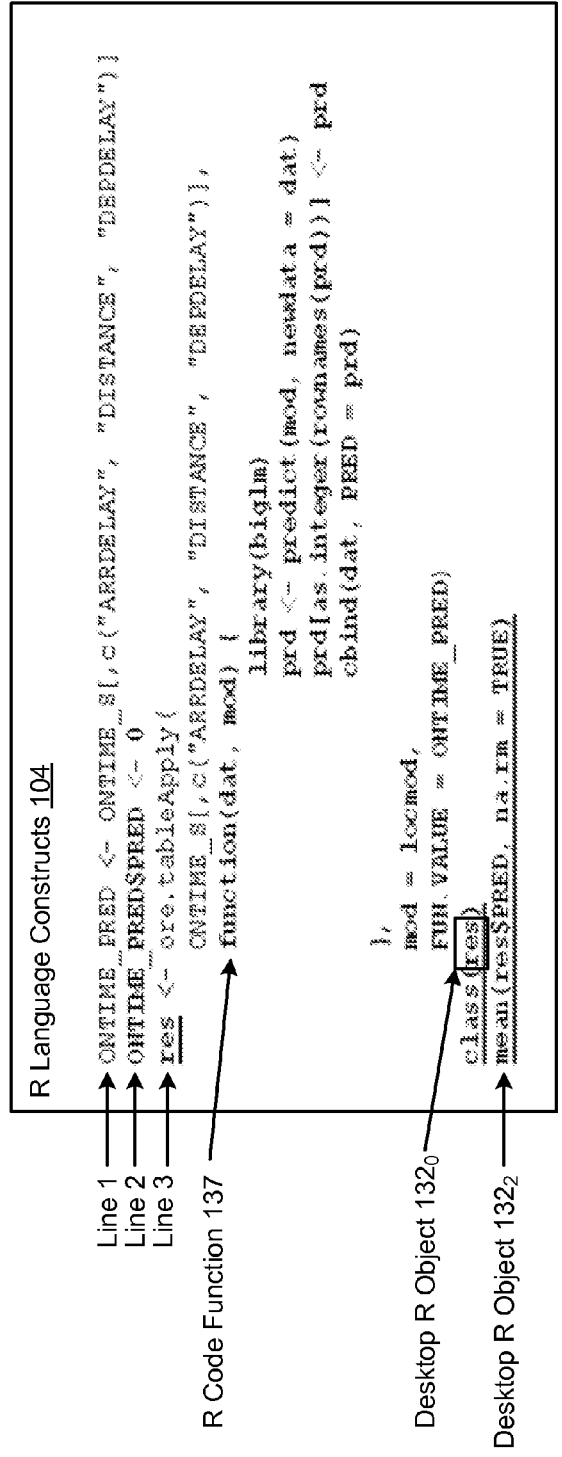
FIG. 1C1

Database Language Constructs 148

```
select * from table(rqTabEval(
    cursor(select ARRDELAY, DISTANCE, DEPDELAY from ontime_s),
    cursor(select * from ontime_lm) /* locmod */,
    'select ARRDELAY, DISTANCE, DEPDELAY, 1 PRED from ontime_s',
    'function(x, param) {
        dat <- data.frame(x)/* added for data marshalling */
        mod <- param[[1]]    /* added for data marshalling */
        library(biglm)
        prd <- predict(mod, newdata = dat)
        prd[as.integer(rownames(prd))] <- prd
        cbind(dat, PRED = prd)
    }'));
```

FIG. 1C2

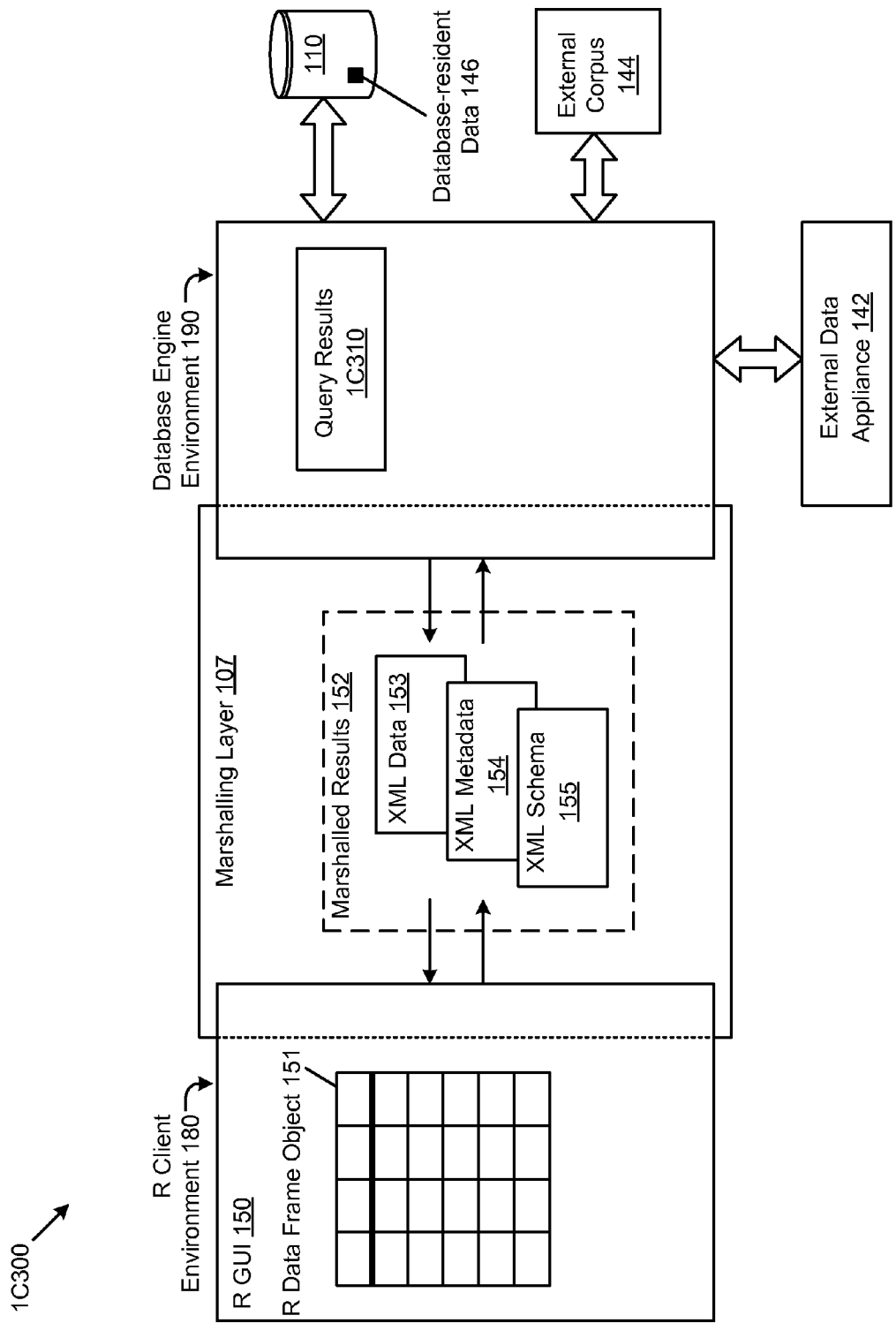
FIG. 1C3

INTERFACING AN R LANGUAGE CLIENT ENVIRONMENT WITH A DATABASE ENGINE

RELATED APPLICATIONS

The present application is related to co-pending U.S. patent application Ser. No. 13/434,563, entitled "OVERLOADING R LANGUAGE CONSTRUCTS WITH DATABASE ENGINE CONSTRUCTS", filed on even date herewith, which is hereby incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosure relates to the field of database engine extensions and more particularly to techniques for interfacing an R language environment with a database engine.

BACKGROUND

Some embodiments of the present disclosure are directed to an improved approach for implementing interfacing an R language client with a database engine. More particularly, disclosed herein are methods and systems for providing a transparency layer for interfacing an R language client with a database engine.

Users of the "R" statistics language want models to be authored using exclusively the R language in a comfortable R language environment. However legacy R client environments run on small "client" machines with limited memory and data space, thus preventing R language-based analysis to be performed on large datasets. Some R client environments implement a client-server model that adds flexibility yet does not resolve the problem exhibited by legacy implementations that require the entire dataset to be resident "in-memory" within the client's memory space. What is needed are techniques for authoring in the R client environment while transparently accessing and manipulating vast data hosted on a large database engine. Moreover, what is needed are techniques for performing the foregoing without the need for rewriting R language code. Prior approaches have introduced new constructs to the language in order to accommodate server-client techniques for accessing and manipulating vast data. In some cases, legacy approaches had to pull the data from the database into the R engine to perform the computation described in the R language and then push the results back to the database. Given the in-memory nature of the R engine, such a solution does not scale, is not secure, and is usually limited to sequential, i.e., non-parallel, execution.

In some situations, such as in the case that the R user is also a database user, the user could write additional scripts in a query language (e.g., SQL) and execute via a connector (e.g., ODBC) which connector could shuttle database resident data. However, R users are typically not database users and thus the legacy approach has been to perform offline data extractions from the database for each specific R analysis task, often using a separate organization such as IT in an enterprise. Such a legacy technique is not only inefficient, it also introduces data governance issues when accessing sensitive data as is often found in an enterprise setting.

Worse, some or all of the following problems exist in the legacy approaches:
- R users need to know SQL which is not a skill extensively possessed by the R user community at large.
- R users must deal with the transformation of data from a database format into a format that is amenable for processing by the R engine.
- Legacy approaches suffer from a lack of options to exploit parallelism.
- R users must explicitly handle a mixture of output objects from R for storage back into the database.
- Even in situations where an R user and a DBA are co-located or can otherwise cooperate, the hand-off of R code from an R user to a SQL DBA is a non-trivial process.

Therefore, there is a need for an improved approach for interfacing an R language client with a database engine.

SUMMARY

The present disclosure provides an improved method, system, and computer program product suited to address the aforementioned issues with legacy approaches.

Disclosed herein are methods, systems, and computer program products for interfacing an R language client environment with a separate database engine environment. The method commences by interpreting an R language code fragment to identify and select R language constructs and transforming the R language constructs into queries or other database language constructs to execute within the database engine environment. The method further implements techniques for transmitting marshalled results (resulting from the execution of the database language constructs) back to the R client environment. In some situations, the marshalled results include an XML schema or DTD or another metadata description of the structure of the results. User conveniences in the form of transparent database query construction, and transparent exploitation of parallelism is achieved by determining the computation resource requirements of executable language constructs, and mapping the execution to one (or more) of, a local R client, a database engine, or a remote execution engine.

Some embodiments support deferred evaluation of queries. In exemplary embodiments, built-in functions serve to capture the intent of a first encountered R expression and generate a corresponding query without initially executing it. Then, if the first encountered R expression is used in some subsequently encountered expression, the transparency layer serves to generate an encompassing query combining the query aspects of both the first encountered as well the subsequently encountered expressions. The encompassing query is executed only if or when the results need to be displayed in a tabular or graphical form in the R client environment.

A remote script call facility serves to connect a remote execution engine with a script repository in the database so as to pass scripts by name. A security environment can be created such that a user can execute (possibly using multiple remote execution engine instances) any accessible scripts that have been made accessible by an administrator.

Further details of aspects, objectives, and advantages of the disclosure are described below in the detailed description, drawings, and claims. Both the foregoing general description of the background and the following detailed description are exemplary and explanatory, and are not intended to be limiting as to the scope of the claims.

BRIEF DESCRIPTION OF THE DRAWINGS

FIG. 1A1 depicts a system for interfacing an R language client with a database engine, according to some embodiments.

FIG. 1A2 depicts possible mapping regimes for interfacing an R language client with a database engine, according to some embodiments.

FIG. 1B1 depicts a client-side mapping regime for interfacing an R language client with a database engine, according to some embodiments.

FIG. 1B2 depicts a database-side mapping regime for interfacing an R language client with a database engine, according to some embodiments.

FIG. 1C1 is an embedded R execution code sample used in systems interfacing an R language client with a database engine, according to some embodiments.

FIG. 1C2 is a query language fragment used in systems interfacing an R language client with a database engine, according to some embodiments.

FIG. 1C3 is a system for marshalling data exchanges when interfacing an R language client with a database engine, according to some embodiments.

FIG. 2 is a sample of R language constructs used in interfacing an R language client with a database engine, according to some embodiments.

FIG. 3A is a graphical user interface for interfacing an R language client with a database engine, according to some embodiments.

DETAILED DESCRIPTION

Figure 2:
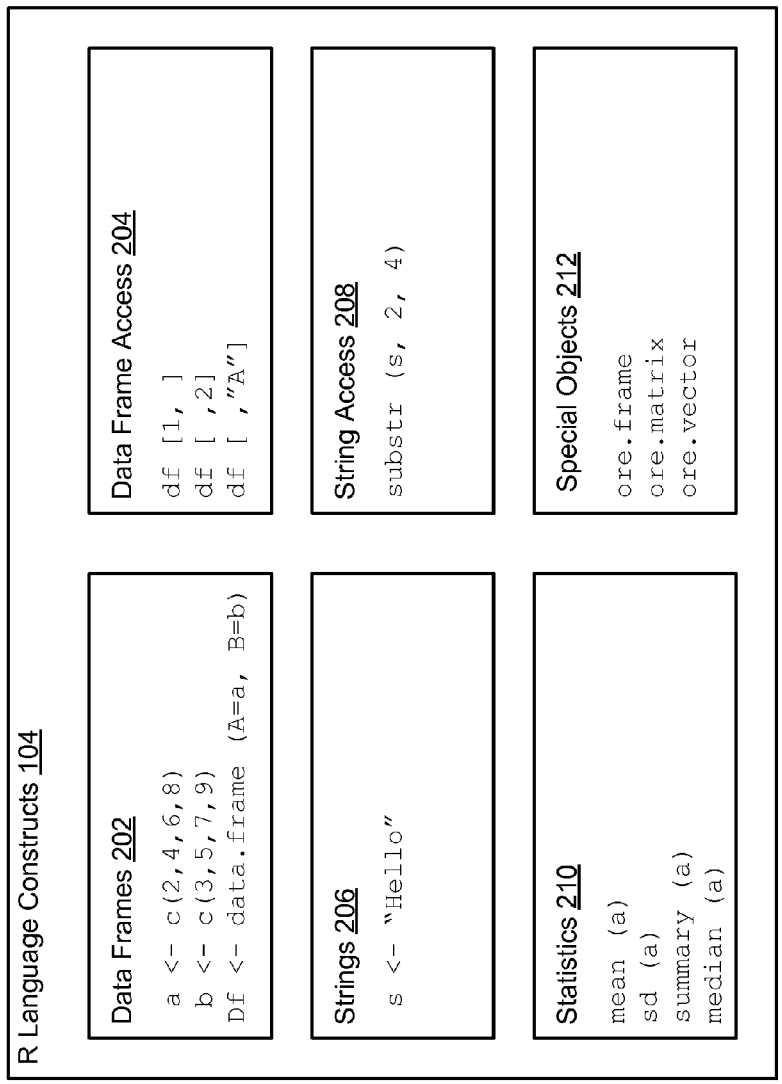

Some embodiments of the present disclosure are directed to an improved approach for implementing interfacing an R language client with a database engine. Other embodiments disclosed herein include methods and systems for providing a transparency layer for interfacing an R language client with a database engine.

Overview

Some R client environments are architected for a workstation, desktop or laptop computing environment, and are limited in terms of memory size. Although some R client environments implement a client-server model that adds flexibility, the mere possibility of a larger overall computing footprint still does not resolve the problem exhibited by legacy implementations that require the entire dataset to be resident "in-memory" within the client's memory space. Prior approaches had to pull the data from the database into the R engine to perform the computation described in the R language and then push the results back to the database. Given the in-memory nature of the R engine such a solution does not scale, is not secure, and is usually limited to sequential execution.

The herein-described techniques address advances in inter-facing an R language client with a database engine, specifically:

The techniques disclosed herein eliminate manual data transfers from/to the database, thus making the system more secure.

The techniques disclosed herein exploit parallelism, resulting in better scalability and performance.

Parallelism is achieved when performing computations on database engine and by processing data in "chunks" in parallel processes.

Moreover the techniques described herein serve to integrate a database engine with the R client environment by allowing users to directly work on database-resident data using the R client environment, and without requiring separate organizations such as IT in an enterprise to service them, for example, by providing database resident data (e.g., data extracts) in a separate process. Following the techniques disclosed herein, R users do not need to learn a query language (e.g., SQL) and do not need to learn database technology fundamentals in order to work with and benefit from the enormous scale that today's database engine can provide.

Some of the techniques disclosed herein implement a layer "on top of" the R engine (e.g., without changing the R engine itself) that:

Overloads certain R data types when they are intended to contain data from a relational schema object (a table or a view);

Overloads certain R language constructs and functions allowed on such data types by generating query language statements (e.g., SQL statements) to provide to the database engine for execution;

Captures the results of database engine execution and returns such results back to the user in the R client environment; and Determines what portions of a given computation are appropriate to execute on a database engine environment versus what portions of a given computation are appropriate to process on the R engine environment.

Techniques to determine what portions of a given computation are appropriate to execute in which environment can be made on the basis of:

Functional capabilities of the database engine vis-à-vis the R engine environment as pertaining to the particular computations at hand;

Performance characteristics of the database engine vis-à-vis the R engine environment as pertaining to the computations at hand; and Determinations as to what portions of the computation for execution on the database engine should be executed natively by the database engine versus what portions should be executed by an instance of the R engine that runs within the database infrastructure (see the discussions of an embedded R instance, below).

There are many techniques, some of which are disclosed herein for determining performance characteristics of the database engine vis-à-vis the R engine. Some approaches are similar to techniques used in a Cost Based query Optimizer (CBO) in RDBMS. In some such cases, decisions are made based on the available data statistics or estimated data statistics and comparing to measured characteristics (e.g., speeds, throughputs, etc.) or specifications of the capabilities of different engines to perform certain types of processing.

The aforementioned layer is referred to herein as the transparency layer. A transparency layer provides transparent integration (e.g., not requiring user intervention) of an R client environment with a separate database engine environment. As earlier indicated, what is needed are techniques for performing transparent integration of an R client environment with a separate database engine environment without the need for rewriting a user's R language code. For example, the transparent integration as disclosed herein eliminates the need for an R user to modify their R script or R scripts in order to explicitly invoke specialized functions.

Some of the functions of this transparency layer include capabilities that:

Allow R users to directly work on database objects without manually porting such database object's contents to the R desktop. It can be recognized that sometimes (e.g., due to dataset sizes when working with large datasets) it is infeasible to port such database object's contents to the R desktop. One such case occurs when the dataset is very large but the results of operations on the very large data set are much smaller than the dataset. In such cases it is possible to port only the results of the computation to the R desktop.

Allow R users to interact with a database engine and with database-resident data without requiring knowledge of the database engine particulars and/or without requiring knowledge of the database engine query language.

Allow R users to transparently harness the compute power of a database engine environment and to analyze/process within the R client environment using datasets that are substantially larger than the memory limits of the R client.

Allow for deferred evaluation of queries.

In exemplary embodiments, the transparency layer functions to first capture the intent of a first encountered R expression and generate a corresponding query without executing it. Then, if the encountered expression is used in some subsequently encountered expression, then the transparency layer functions to generate an encompassing query combining the query aspects of both the first encountered as well the subsequently encountered expressions. The encompassing query is executed only if or when the results need to be displayed in a tabular or graphical form in the R client environment. As would be recognized by one skilled in the art, an advantageous application of deferred evaluation serves to reduce or eliminate demands for memory. More particularly, certain function invocations and evaluations can result in replication of input arguments (and other language constructs) which can quickly consume available memory. Still further, deferred evaluation serves to reduce or eliminate redundant operations. For example a first expression (e.g., one that includes calculating function of some column of a large table) and a second expression (e.g., one that selects a small subset of this column) can be optimized using deferred evaluation. In this context, when using deferred evaluation, the combined query (e.g., encompassing the first expression and the second expression) will be executed in a different order than in order of appearance, namely, first the subset will be selected and then the function will be applied only on the selected subset.

Some of the modules of systems implemented in accordance with herein-described techniques include:

Transparency layer implementations for overloading R data types, language constructs, and functions in order to operate directly on database engine objects: In some cases, transparency layer implementations overload all top level R language constructs, thus making them efficient and autonomous black boxes when working with database data.

Using the user's R code for specification of intent: Execution is autonomously orchestrated using a combination of database engine process instances and R engine instances. In some cases the R engine instances can be either running on the R user's desktop or can be running inside the database engine infrastructure. In some embodiments (further discussed herein) an R engine instance (e.g., an R language interpreter 112, see infra) can be spawned by the database engine to execute R code. This spawned R engine instance may be from the same code base and have the same capabilities as a corresponding instance in the user's desktop.

Employing an execution orchestration optimizer that determines what portions of a computation expressed in R on a database object should be executed, and where (see above).

Supporting language constructions that provide explicit control to a user that wants to specify or influence the actions of the execution orchestration: As earlier indicated, following the disclosed techniques herein, a user does not have to learn any new technologies; neither a query language nor the technologies involved in using a database engine.

Given the herein-disclosed database connector, R users do not need to see or deal with external database connections. Such connections can be handled transparently via a profile file (e.g., an Rprofile file). Objects that are resident in the external database can be automatically surfaced within the user's environment as R objects. In different embodiments, only certain objects that are resident in the external database are automatically surfaced within the user's environment as R objects, and some or all of the objects are subjected to access/security restrictions, and the user's permissions to access the objects. Although in the foregoing, the use of a profile file serves to aid transparency, some embodiments provide explicit functions that a user may invoke to connect to the database, disconnect from the database, attach objects from specific schemas, and so on. In addition, it is possible to control visibility such that only the objects in the connected-to-schema are exposed or otherwise made visible. Some embodiments manage security and access rights when accessing objects under a given schema. Although the profile file can make even such invocations transparent, use of a profile file is not required in any particular embodiment.

In some embodiments, only the objects in the schema connected to are exposed—not all database objects.

R constructs that are graphical in nature, and R constructs that are non-graphical in nature are treated equivalently. In some implementations, R language graphics methods are overloaded to interoperate with database-resident objects. For example, in some cases, graphics routines are configured to explicitly deal with performing as much of the computation in the database, while returning only summaries or statistics required for graphing. Some graphical functions, such as scatter plots, conceptually display "all of the data", however in practical cases, only a summary (e.g., a sampling) of the data need be presented graphically. Accordingly, the overloaded routines can be configured to consider subsets, summaries and/or sampling in order to avoid retrieving all the data, yet retrieving enough data for a representative depiction.

In some embodiments, modules of systems for interfacing an R client environment with a database engine in accordance with herein-described techniques can be organized as follows:

A database library, including query language extensions.
A transparency layer, comprising:
  A set of packages mapping R data types to Oracle Database objects.
  A module for transparent SQL generation for R expressions on mapped data types.
  A module to enable direct interaction with database-resident data using R language constructs.
  A module to enable R users to work with data larger than is provided by the desktop system memory.
A statistics package comprising a set of statistical functions and procedures for commonly-used statistical libraries.
A set of query language extensions comprising:
  A module to enable database server execution of R code to facilitate embedding R in operational systems.
  A module to enable dataflow parallelism.
  A module for generation of XML output for marshalling/unmarshalling.
  A module for optimizing execution.
R Packages:
  An external database connector component comprising R packages that enable working directly with an external database.
  Further R packages that include components to provide graphics to web-based tools (e.g., OBIEE) for dashboard generation or report generation.

DESCRIPTIONS OF EXEMPLARY EMBODIMENTS

Figures 1, 3A:
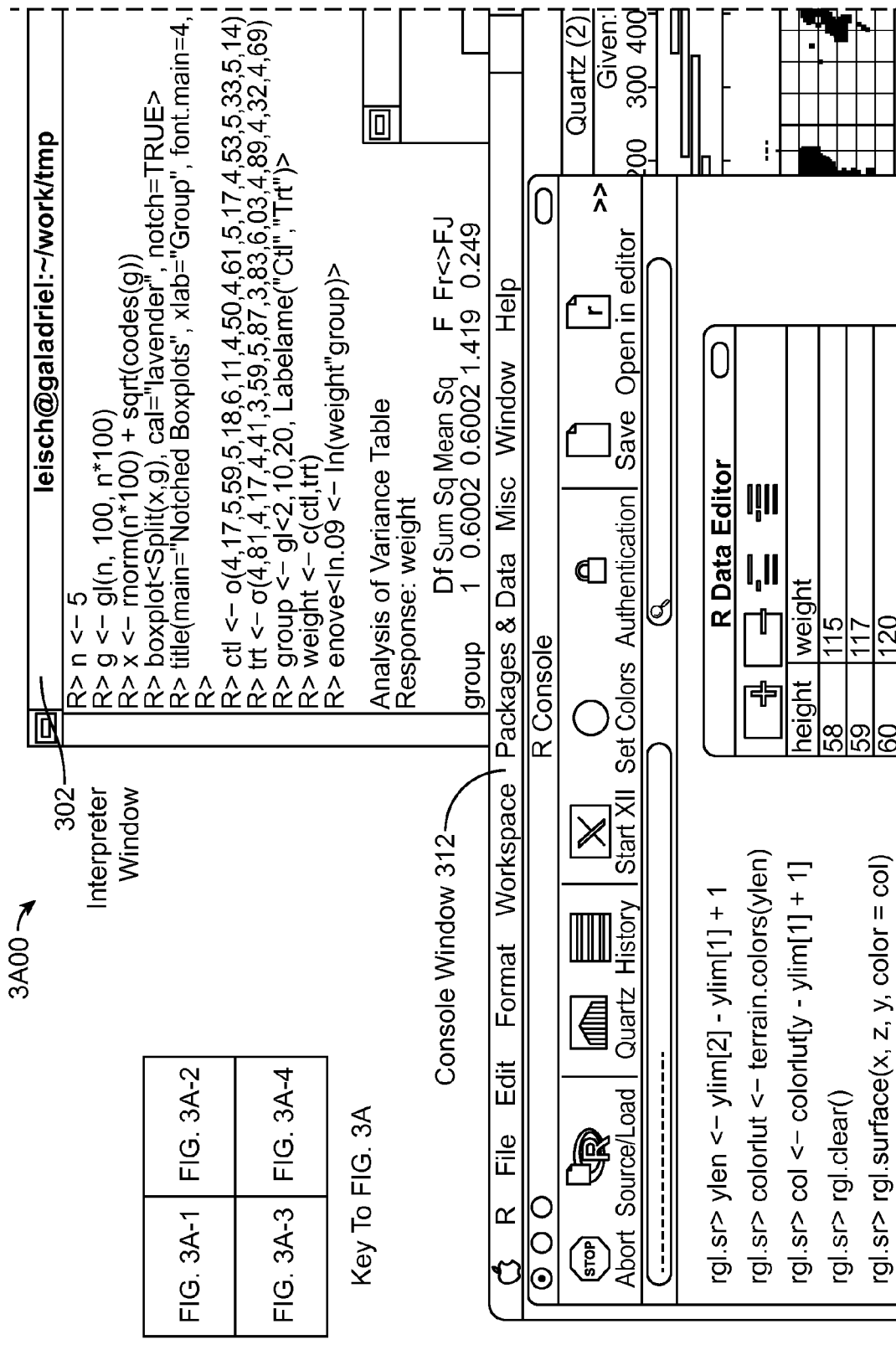
Figures 2, 3A:
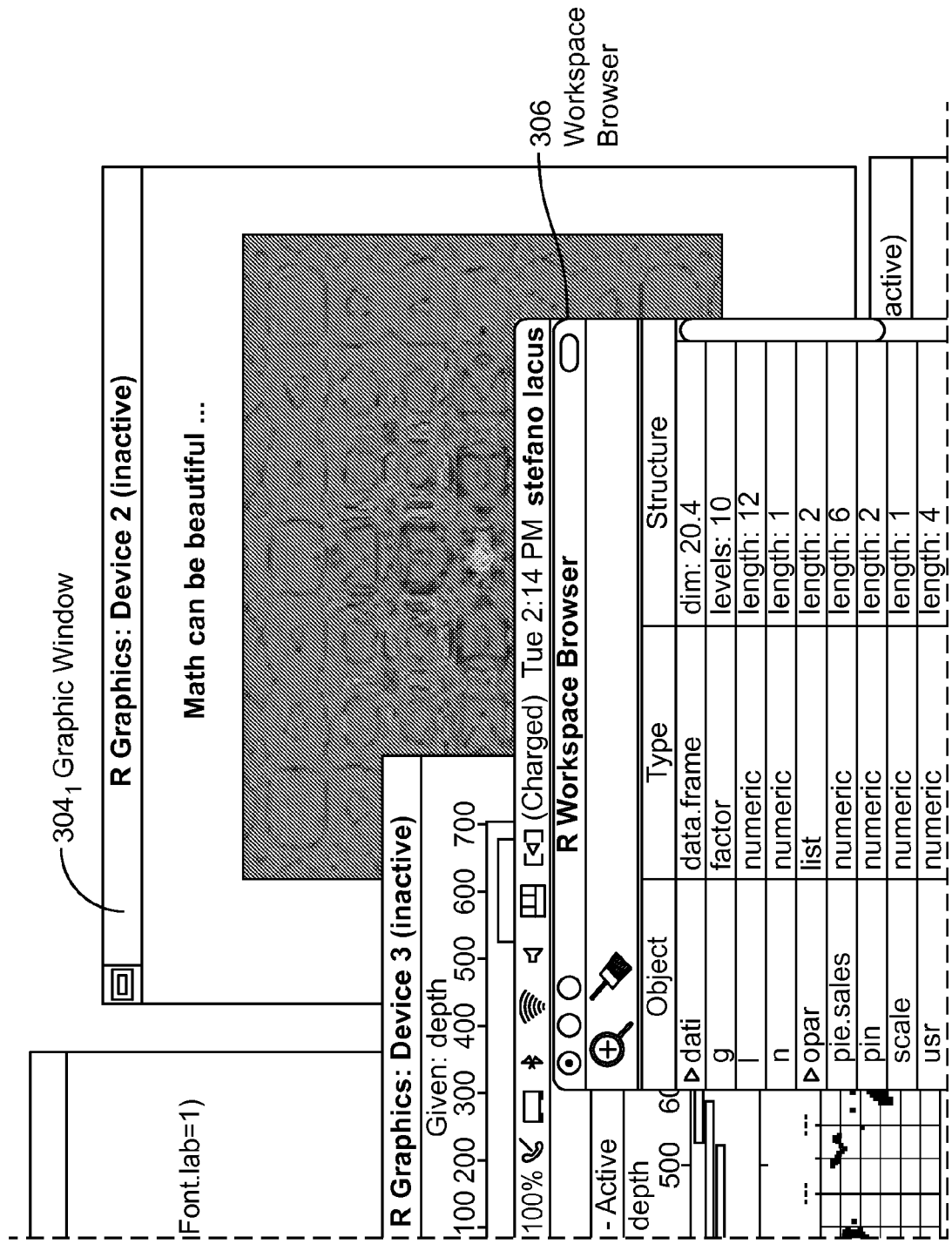

FIG. 1A1 depicts a system 1A100 for interfacing an R language client with a database engine. As an option, the present system 1A100 may be implemented in the context of the architecture and functionality of the embodiments described herein. Also, the system 1A100 or any aspect therein may be implemented in any desired environment.

As shown, an R client environment 180 comprising an R engine 102 communicates with a database engine environment 190 comprising a database engine 108. The database engine 108 is in communication with a database 110 (e.g., a disk drive). Also, the database engine 108 is in communication with an external corpus 144, and is in communication with an external data appliance 142.

In exemplary embodiments, a database engine 108 comprises techniques for processing one or more instances of a database language construct 148 (e.g., a query language statement, SQL code, etc.). And in exemplary embodiments, an R engine 102 comprises techniques for processing one or more instances of an R language construct 104, and for processing statistics, for example, using an R statistics package $114_0$. An R engine 102 implements an R language interpreter $112_0$. The database engine 108 comprises an instance of an R statistics package in the form of an embedded R language interpreter $113_0$, and an instance of an R statistics package in the form of an embedded R statistics package $115_0$.

Referring to the R client environment 180, the R engine 102 is in communication with a transparency layer 101, which is in turn in communication with a marshalling layer 107. And, referring to the database engine environment 190, a database engine 108 is in communication with the marshalling layer 107.

The R engine 102 can comprise an interface package 106, which interface package facilitates extending the R client environment.

FIG. 1A2 depicts possible mapping regimes 1A200 for interfacing an R language client with a database engine. As an option, the present mapping regimes 1A200 may be implemented in the context of the architecture and functionality of the embodiments described herein. Also, the mapping regimes 1A200 or any aspect therein may be implemented in any desired environment.

As discussed above, some embodiments employ an execution orchestration optimizer that determines what functions to be performed for interfacing an R language client with a database engine should be implemented in which environment. Strictly as an example, an execution orchestration optimizer can distribute portions of a computation expressed in R on a database object to be executed within the database engine. It is also possible that a user is given substantial control over what functions are to be performed in which environment.

The mapping regimes 1A200 give but some of the possible mappings, which mappings are presently discussed. As shown, various user functions 1A210 (e.g., editing R code, retrieving data, summarizing data, etc.) can be implemented within the R client environment. For example, the column denoted "Near-Native Usages" shows the function of editing in R code within the R client environment (denoted $R_{EDIT}$) and the function of manual results analysis being performed within the R client environment (also denoted as $R_{EDIT}$). Further following this exemplary mapping, the function of retrieving data can be mapped so as to be performed either in the R client environment (and so denoted as $R_{GETDATA}$), or in the database engine environment (and so denoted as $DB_{GETDATA}$).

In another mapping, for example as depicted in the column labeled "Large Data Situations", data might be retrieved from a database engine environment (and so denoted as $DB_{GETDATA}$), and that retrieved data be provided to the R client environment for summarization in the R client environment (denoted $R_{SUMMARIZE}$). To do so, embodiments of the present disclosure perform a marshalling operation and/or an unmarshalling operation. Such a marshalling or unmarshalling operation is denoted within the mapping regimes 1A200 as a solid square. In this example for "Large Data Situations", data might be retrieved from a database engine environment (and so denoted as $DB_{GETDATA}$), and that retrieved data marshalled into the R client environment for summarization (denoted $R_{SUMMARIZE}$). Various techniques can be used for marshalling and unmarshalling data, including providing metadata. Such techniques are discussed infra.

In an embodiment involving the external database connector 140 and an external data appliance 142, not only is the data retrieved via $DB_{GETDATA}$, but also the data is summarized at the database engine using function $DB_{SUMMARIZE}$. This technique has attributes of higher security. A boundary is shown and the technique is labeled as the data sequestering model 1A220. As can be understood by those skilled in the art, some data corpora are extremely large, possibly involving petabytes or exabytes of data, and thus, it is expeditious that even distilling down to the summary data is performed on a large machine, such as is more likely to be found as a host of a database engine environment than in an R client environment. Accordingly the function $DB_{SUMMARIZE}$, and possibly also the function $DB_{STATISTICS}$ is performed on a large machine such as is found in a database engine environment.

Still more, there are situations where the raw data to be analyzed is proprietary or sensitive, and needs to be tightly governed. In such situations it is possible to follow a mapping where the sensitive raw data is never communicated between the external database (e.g., external corpus 144, or external data appliance 142) and the R client environment. The statistics are performed on the sensitive data within the database engine environment (which has applicable security provisions) using an embedded R language interpreter. Following such a mapping regime it is possible that an R researcher can perform statistics on a sensitive set of data, yet never actually have access to the sensitive set of data.

FIG. 1B1 depicts a client-side mapping regime 1B100 for interfacing an R language client with a database engine. As an option, the present client-side mapping regime 1B100 may be implemented in the context of the architecture and functionality of the embodiments described herein. Also, the client-side mapping regime 1B100 or any aspect therein may be implemented in any desired environment.

Systems for interfacing an R engine with a database engine can employ the transparency layer for overloading R data types and R language constructs and functions in order to operate directly on database engine objects. As shown in FIG. 1B1, such a transparency layer (e.g., the portion of transparency layer $101_1$) can receive one or more R language constructs 104 (e.g., an R language code fragment 152) and perform operations on those constructs in order to process the R language constructs for making the R language constructs operate in the R engine, even though the data is marshalled/unmarshalled from the database data.

The operations performed on the R constructs can include transforming (see transformer module 122), partitioning (see partitioner module 124), and mapping (see mapper module 126). In some cases, data is marshalled/unmarshalled from database data, and it is merely the data (or metadata) exchanged between the R engine 102 and the database engine 108. In other situations, the partitioner module and/or mapper module can determine that some parts of the R language interpreter $112_1$ and/or some portions of the R statistics package $114_1$ can be advantageously distributed to operations performed on the database engine 108. Execution of the distributed operations on either the R engine 102 or the database engine 108 can be autonomously orchestrated using a combination of R engine instances (e.g., instances of R language interpreter $112_1$) and database engine process instances. A database-side mapping regime is presently discussed.

FIG. 1B2 depicts a database-side mapping regime 1B200 for interfacing an R language client with a database engine. As an option, the present database-side mapping regime 1B200 may be implemented in the context of the architecture and functionality of the embodiments described herein. Also, the database-side mapping regime 1B200 or any aspect therein may be implemented in any desired environment.

As earlier foreshadowed, a plurality of embedded R language interpreters can be running inside the database engine infrastructure (e.g., in a database engine environment 190). Some embodiments spawn embedded R instances in the form of one or more embedded R language interpreters (e.g., embedded R language interpreter $113_1$, embedded R language interpreter $113_2$) and the embedded R language interpreters can access an embedded R statistics package $115_1$.

In this embodiment, R users interact with one or more instances of an R object 128 that appear within the user's environment as R objects, even though the processing that results in the contents of such R objects is performed in the database engine environment 190, possibly using instances of an embedded R language interpreter $113_1$ and/or instances of an embedded R statistics package $115_1$. Marshalling and/or unmarshalling is handled using a marshalling layer 107 (see FIG. 1A1) using convenient data handling techniques.

In some cases, an R object can occur in the form of a desktop R object, or in the form of a passed R object (see FIG. 1C1, and see FIG. 1C2). More particularly, embodiments can determine using a transformer module 122 (and/or other portions of the transparency layer) when a desktop R object can be persisted as a desktop R object, or when it can be transformed into the form of a passed R object. Such cases are discussed below.

FIG. 1C1 is an embedded R execution code sample 1C100 used in systems interfacing an R language client with a database engine. As an option, the present embedded R execution code sample 1C100 or variations may be implemented in the context of the architecture and functionality of the embodiments described herein.

The embedded R execution code sample 1C100 includes desktop R objects (e.g., desktop R object $132_0$, desktop R object $132_1$, and desktop R object $132_2$). Now, referring to desktop R object $132_0$, in the exemplary embedded R execution code sample 1C100, the code projects columns ARRDELAY, DISTANCE and DEPDELAY from the ONTIME_S table and passes them as input to be sent to the R code function 137, as shown. Other local R objects from the desktop can be passed in to the R code as shown in underlined text. Output gets created as a new column PRE D, and the subsequent cbind call serves to add a new column to dat. The output from this embedded R execution code sample surfaces in the user's desktop as an R object, the data for which was determined using a query (see FIG. 1C2). The foregoing description is an example of embedded R execution using the function ore.tableApply from the R environment. In this code example, line 1 and line 2 are used to define the format of the result data. A subset of the ONTIME_S table is passed to ore.tableApply as an argument. The function call starting in line 3 serves to request the R function specified therein to be executed using an R engine at the database. The first argument to ore.tableApply is the input data. This is specified using the transparency layer since ONTIME_S is a reference to a database table. The second argument is the R function (R code function 137) to execute with the input data being passed as an R data.frame in dat, and the input argument mod provides a reference to a machine learning model (not shown) for scoring the input data. The argument ore.tableApply is an R object locmod that is an instance of biglm. After execution of ore.tableApply, the embedded R execution code sample 1C100 checks the class of res and then computes the mean of the predicted values. The foregoing description further illustrates using an overloaded R function (in this case the function "mean") using the transparency layer since the object "res" is an object comporting to the subclass ore.frame, and where ore.frame is a subclass of data.frame.

In some embodiments, the transparency layer serves to perform optimizations based on inter-operation mapping of R language constructs. For example, a transformer/mapper makes a determination of a mapping based on occurrence of R language constructs that appear in different operations. More specifically, the transformer/mapper functionalities (e.g., transformer module 122 and/or mapper module 126), serve separately or in combination to interpret an R language code fragment in order to identify both a first group of R language constructs, and a second group of R language constructs, the second group of R language constructs depending from the first group of R language constructs, and then to perform one or more transformer/mapper optimizations based on inter-operation mapping of R language constructs.

FIG. 1C2 is a query language fragment 1C200 used in systems interfacing an R language client with a database engine. As an option, the present query language fragment 1C200 may be implemented in the context of the architecture and functionality of the embodiments described herein.

As shown, the database language constructs include native database language constructs 148 in the form of an SQL "select" construction. Such a transformation from an R language construct to a database language construct is performed by the transformer module 122 in conjunction with any other portions of transparency layer 101$_1$, and without user intervention. In the aforementioned exemplary cases, all aspects of a production R deployment (e.g., arbitrary input, arbitrary output, arbitrary R code) are all captured elegantly without requiring the user to code any database language constructs.

Using a transformer module 122 in conjunction with any other portions of transparency layer 101$_1$, (and without user intervention) the R code shown in FIG. 1C1 is used to generate the database language constructs of FIG. 1C2.

In addition to the transformation, embodiments according to the disclosures herein also perform data marshallling and un-marshalling between the R engine 102 and the database engine 108. Moreover R objects are passed between the R engine 102 and the database engine 108 so as to surface the R objects within the R client environment 180 even though the contents of the R objects may have been generated in the database engine environment 190.

In addition to the fully-automatic transformation heretofore described, it is possible that an R user desires to be explicit about what R objects are to be handled as a passed R object and which are to be handled as a desktop R object. Moreover, integrating R language constructs with database language constructs in the form of an R function allows for elegantly managing marshalling the structure and data types of R to enable further actions on the marshalled results, such as providing inserts into an R data frame object or surfacing an R object to the R user within the R desktop (e.g., within a GUI in the R client environment).

Still further, in addition to the heretofore described fully-automatic transformation of R language constructs into database language constructs, parallelism can be exploited automatically by the database. For example, by selecting the appropriate table function such as rqRowEval ( ), evaluation of the function provides "row level parallelism" (i.e., provides parallel row streams as input) to the R code. Similarly, the function rqGroupEval provides "group-level parallelism". Of course there are other techniques for exploiting parallelism that are natively performed by the underlying instance of a database engine. For example, parallelism can be achieved as a consequence of translation of R functions into a database engine query language (e.g., SQL). Particularly in the case of the database engine query language being SQL, when the transparency layer translates R functions to SQL, the execution of the SQL can take advantage of database parallelism when parallel execution is enabled on the underlying database table(s).

Even in the case of exploited parallelisms, whether by operation of the transparency layer, or by operation of the underlying instance of a database engine, the data can regardless be marshalled.

Figures 3, 3A:
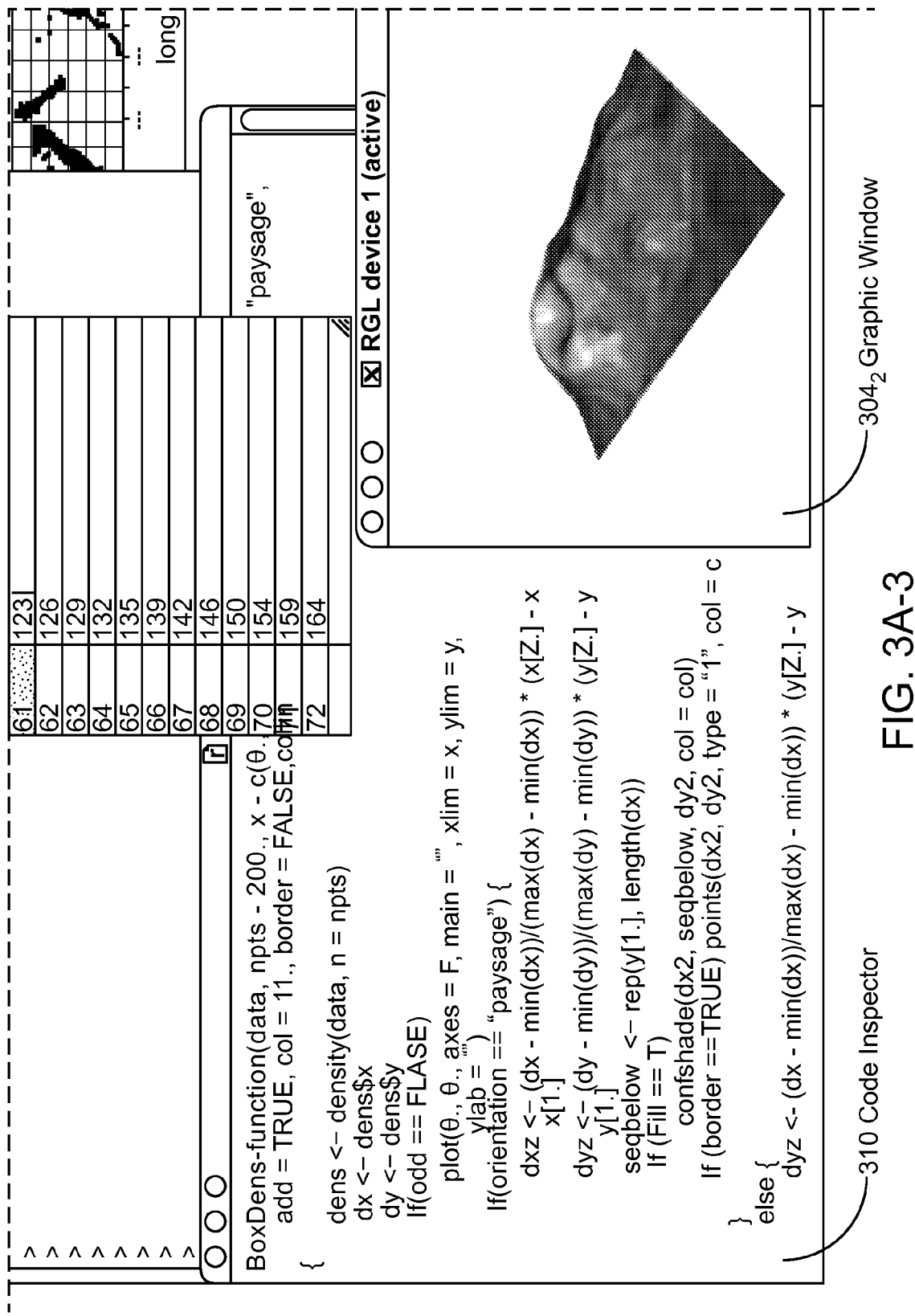
Figures 3, 3A, 4:
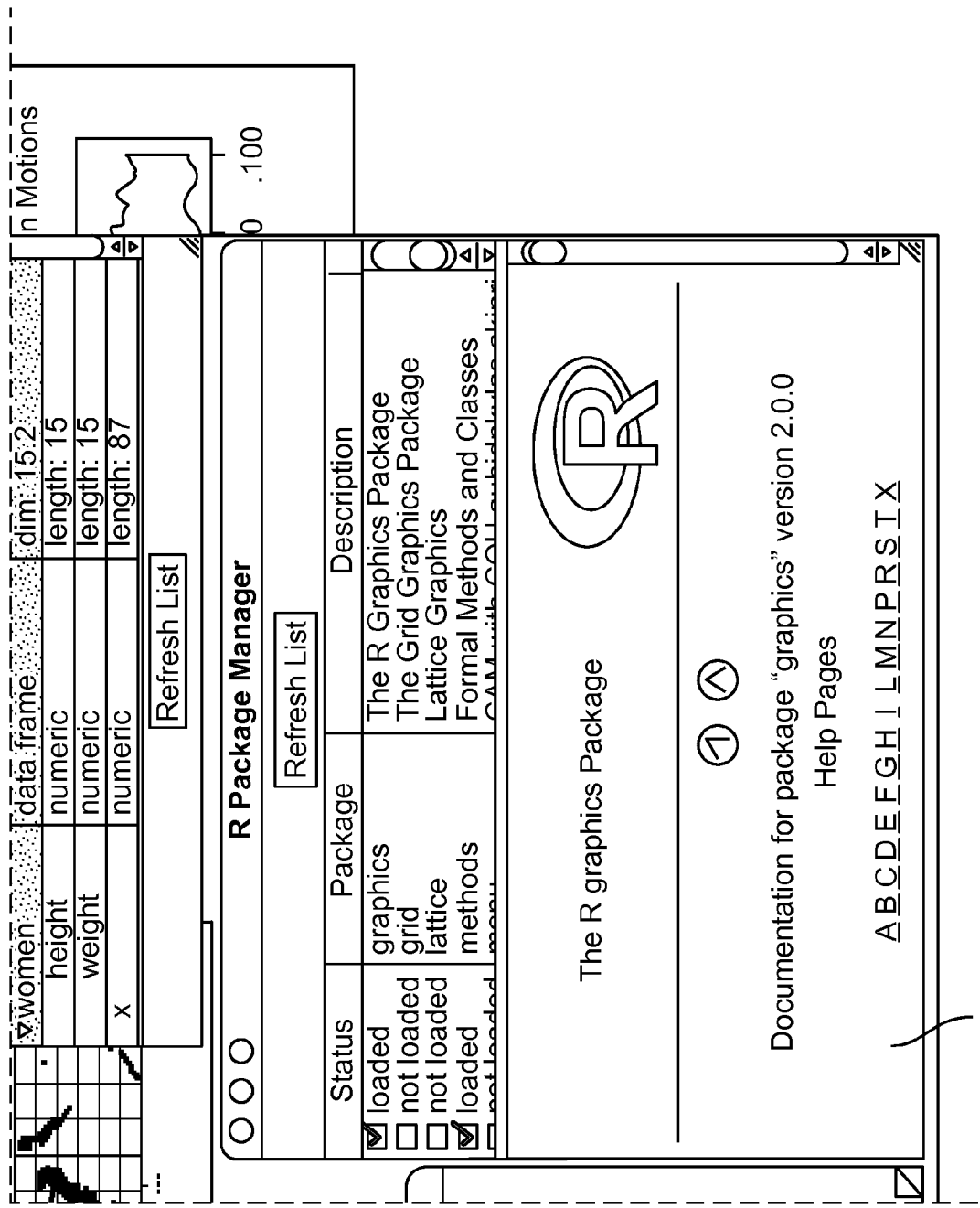

FIG. 1C3 is a system 1C300 for marshalling data exchanges when interfacing an R language client with a database engine. As an option, the present system 1C300 may be implemented in the context of the architecture and functionality of the embodiments described herein. Also, the system 1C300 or any aspect therein may be implemented in any desired environment.

As shown, the system 1C300 includes an R client environment 180 in communication with a database engine environment 190 via a marshalling layer 107. Following heretofore-described embodiments, the database engine environment 190 can produce results in the form of query results 1C310, and the query results can be stored as database-resident data 146. In some embodiments, the query results may have been formed by using database-resident data 146; in other embodiments the query results may have been formed by using an external corpus 144 or possibly by using an external data appliance 142. In any of these cases, the query results can be marshalled for use by the R GUI 150.

In some cases, the marshalled query results are in the form of XML data 153, and are loaded directly into the R GUI, possibly in the form of an R data frame object 151. In other cases, in particular when the data is large, the marshalled query results are given in the form of XML metadata 154, possibly in combination with an XML schema 155 (e.g., an XML .xsd file or an XML DTD).

In some situations the XML metadata 154 is sufficient such that various GUI devices in the R client environment can be enabled and/or populated for ease of use. For example, a GUI drop-down menu in the R client environment can be auto-populated from XML metadata 154.

FIG. 2 is a sample 200 of R language constructs used in interfacing an R language client with a database engine. As an option, the present R language constructs may be implemented in the context of the architecture and functionality of the embodiments described herein. Also, the R language constructs or any aspect therein may be implemented in any desired environment.

As shown, the R language constructs 104 depict only a sampling of R language constructs 104 that are used in interfacing an R language client with a database engine. The constructs shown are merely exemplary, and comprise constructs for data frames 202, constructs for data frame access 204, and constructs for special objects 212. Also shown are constructs for strings 206, constructs for string access 208, and constructs for statistics 210.

FIG. 3A is a graphical user interface 3A00 for interfacing an R language client with a database engine. As an option, the present graphical user interface 3A00 may be implemented in the context of the architecture and functionality of the embodiments described herein. Also, the graphical user interface 3A00 or any aspect therein may be implemented in any desired environment.

The shown graphical user interface 3A00 includes many windows in an arrangement. An R user would interact with one or more windows (e.g., an interpreter window 302, a graphic window 304$_1$, a workspace browser 306, a package manager 308, a graphic window 304$_2$, a code inspector 310, and a console window 312) in order to avail use of the facilities of an R client environment (e.g., any of the functions as shown in FIG. 1A2). The graphical user interface 3A00 as shown is purely exemplary, and other embodiments, other windows, other arrangements, etcetera are reasonable and envisioned. In fact a given graphical user interface 3A00 can be simpler (e.g., the default R GUI) or can be more extensive than the graphical user interface 3A00 as shown.

Figure 3B:
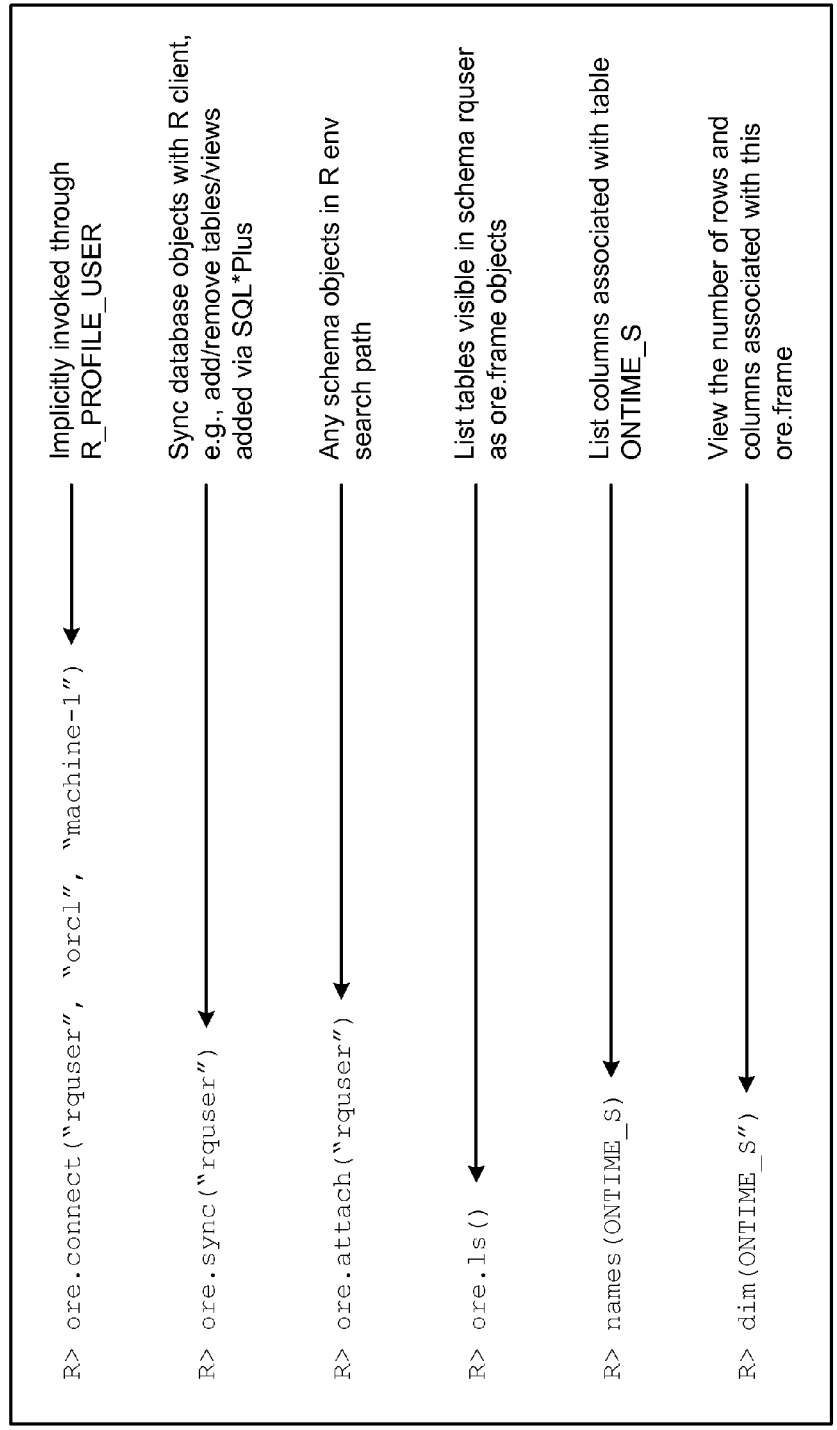
FIG. 3B is a console view of a code fragment for interfacing an R language client with a database engine, according to some embodiments.

FIG. 3B is a console view of a code fragment 3B00 for interfacing an R language client with a database engine. As an option, the present code fragment 3B00 may be implemented in the context of the architecture and functionality of the embodiments described herein. Also, the code fragment 3B00 or any aspect therein may be implemented in any desired environment.

Referring to the console window 312 as discussed in FIG. 3A, an R user can interact using an R GUI. More specifically, an R user can interact with an R language interpreter, and an example of such interaction is shown as the console view of a code fragment 3B00. The selected aspects of the code fragment 3B00 are purely exemplary, and other R language constructs can appear in a console view. Also, the selected aspects are input commands, and the output from such commands can appear in other windows. For example, the console input given as "R>ore.ls ( )" is a command to list in the R GUI, the tables and views visible to the database user "rquser".

As further examples of code fragments that can appear in a console view, note the following:

---
dat <- ONTIME_S[ONTIME_S$ARRDELAY < 100 &  (line 1)
        ONTIME_S$ARRDELAY > −100,]
ad <- with(dat,split(ARRDELAY, UNIQUECARRIER))
boxplot(ad, col = "blue", notch = TRUE, cex=0.5,  (line 4)
        varwidth = TRUE)
sapply(ad, length)
sapply(ad, mean, na.rm=TRUE)
---

The first line (see line 1) produces a view corresponding to the subset of the ONTIME_S table where the arrival delay is within the range −100 and 100. The call to split ( ) divides the data in a vector x into the groups defined by a factor f. The result is a list with elements corresponding to the partitioned data. The graphic function boxplot (see line 4) uses the split ( ) result to plot the arrival delay distribution according to airline (unique carrier). Then sapply ( ) invokes the function on the list and returns a vector or matrix of the same length. In this case, the code fragment computes the number of rows in each subset produced by split ( ), and then computes the mean arrival delay on that same split ( ) results.

Figure 4A:
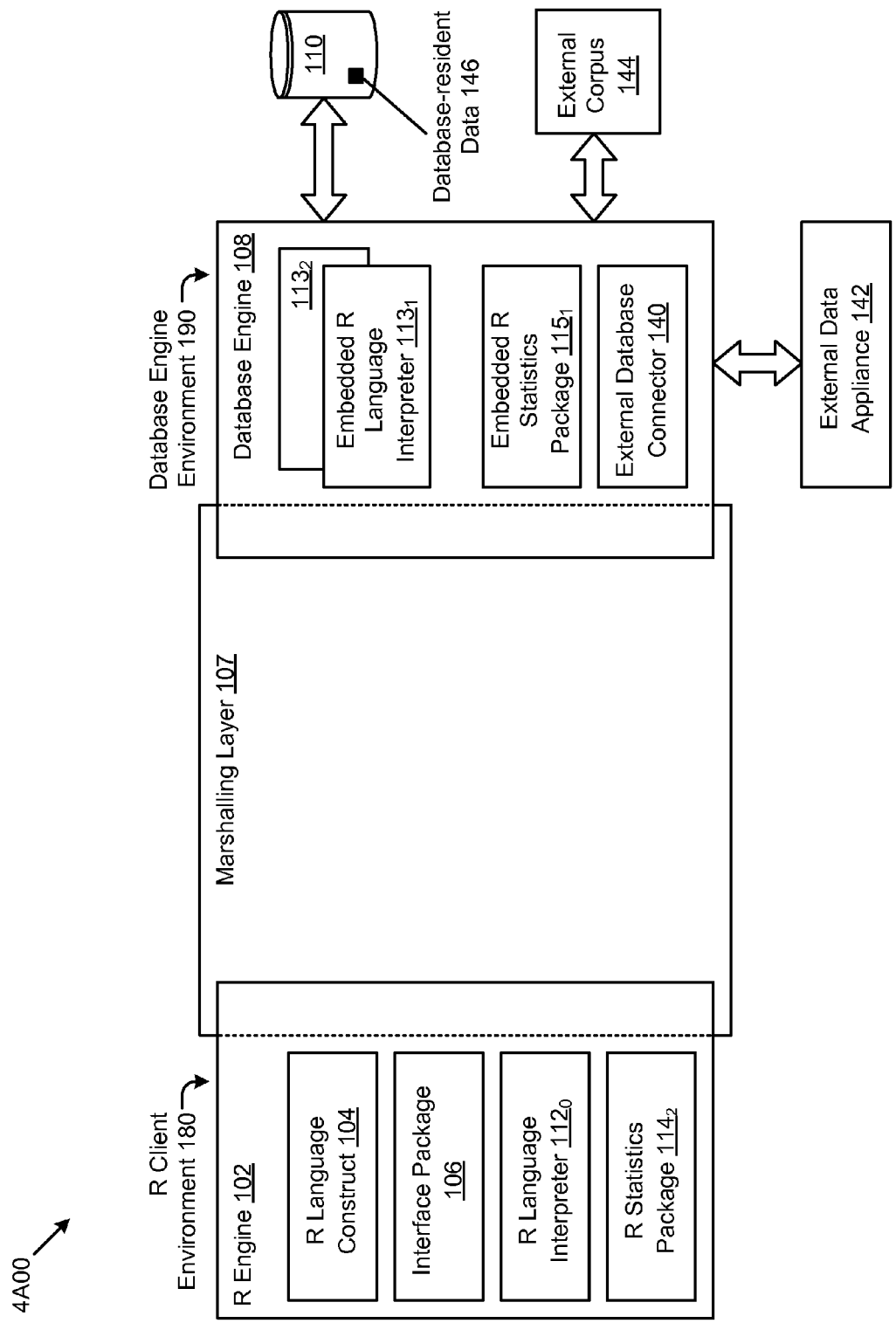
FIG. 4A is a system for hosting remote execution engines when interfacing an R language client with a database engine, according to some embodiments.

FIG. 4A is a system 4A00 for hosting remote execution engines when interfacing an R language client with a database engine. As an option, the present system 4A00 may be implemented in the context of the architecture and functionality of the embodiments described herein. Also, the system 4A00 or any aspect therein may be implemented in any desired environment.

A given operation might be executed in the R client environment, or, depending on the efficacy of alternatives, the given operation might be executed in a database environment, or in a remote environment. For example, certain system operations and/or R language constructs are most conveniently executed in an R client environment. Strictly as examples, portions of the transparency layer that reside in the R client environment are conveniently executed on the R engine 102. In particular, portions of the transparency layer that reside in the R client environment perform operations to intercept R functions for remote execution (e.g., in the database engine environment for scalable in-DB execution). The transparency layer that resides in the R client environment can intercept data transforms, statistical functions, and advanced analytics.

Certain R client environment GUI operations such as interactive display of graphical results and flow control are conveniently executed in the R engine. And certain dispatch functions such as packaging in order to submit R scripts for remote embedded execution (e.g., in a database engine environment) are conveniently executed in the R engine running within the database engine 108. Similarly, dispatch functions such as packaging in order to connect to an external data appliance interact are conveniently executed in the R engine.

On another hand, certain other operations, especially database-related operations, can be conveniently executed in the database engine environment. For example, database operations such as accessing tables and views (and external tables and views) are conveniently executed in a database engine environment. For some operations, performing the operations in the database engine environment leverages inherent and explicit database parallelism.

In yet other cases, certain operations are spawned for execution in a remote execution environment. For example, a database engine can spawn multiple R language interpreter engines for execution of R language constructs or R scripts that are compute intensive, or otherwise demand the resources present in a database engine environment. In some cases operations to emulate map-reduce style algorithms are spawned for execution in a remote execution environment.

One case of operations spawned for execution in a remote execution environment includes operations that although they can be performed in an R statistics package $114_2$ within the R client environment, they alternatively can be performed in an embedded R statistics package 115 (e.g., embedded R statistics package $115_1$). Such statistics operations hail from, but are not limited to, statistics operations from the R client environment. Table 1 gives some statistics package functions:

TABLE 1

| Statistics Package Functions |
| --- |
| Special Functions |
| Gamma function<br>Natural logarithm of the Gamma function<br>Digamma function<br>Trigamma function<br>Error function<br>Complementary error function |
| Statistics Package Tests |
| Chi-square, McNemar, Bowker<br>Simple weighted kappas<br>Cochran-Mantel-Haenzel correlation<br>Cramer's V<br>Binomial, KS, t, F, Wilcox<br>Statistics Package Base SAS Equivalents |
| Frequency, Summary, Sort<br>Rank, Correlation, Univariate<br>Density, Probability, and Quantile Functions |
| Standard normal distribution<br>Chi-square distribution<br>Exponential distribution<br>Special Functions |
| F-distribution<br>Density Function<br>Probability Function<br>Quantile<br>Gamma distribution<br>Beta distribution<br>Cauchy distribution<br>Student's t distribution<br>Weibull distribution |

In this embodiment, portions of the transparency layer that reside in the R client environment can determine the computation resource requirements of an operation (e.g., the computation resource requirements of processing an R language construct), then mapping the operation to itself (e.g., in the R engine 102) or mapping to a database engine 108, or mapping to a remote execution engine (e.g., embedded R language interpreter $113_1$, embedded R language interpreter $113_2$, etc.).

Figure 4B:
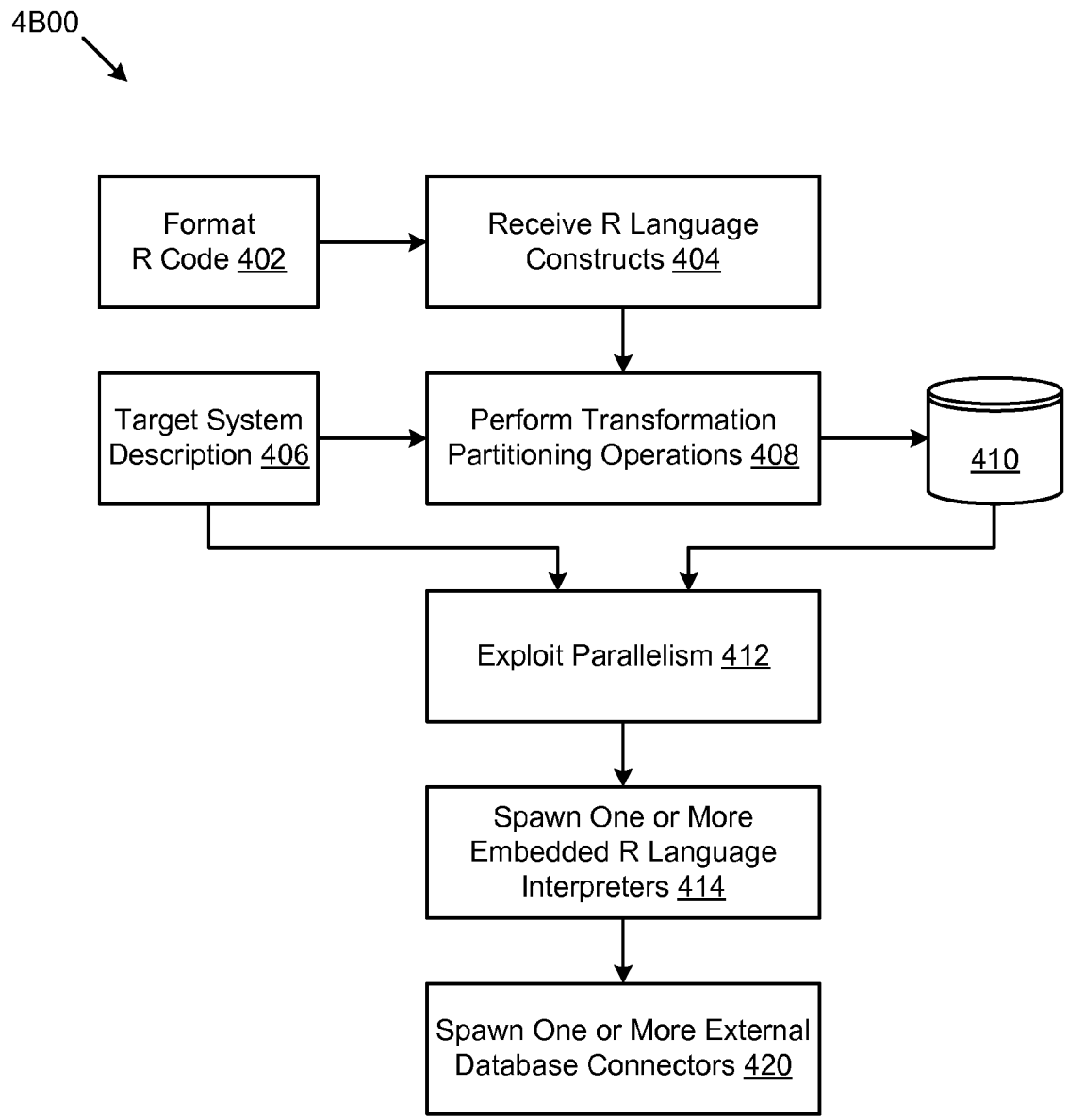
FIG. 4B is a system for spawning remote execution engines when interfacing an R language client with a database engine, according to some embodiments.

FIG. 4B is a system 4B00 for spawning remote execution engines when interfacing an R language client with a database engine. As an option, the present system 4B00 may be implemented in the context of the architecture and functionality of the embodiments described herein. Also, the system 4B00 or any aspect therein may be implemented in any desired environment.

As shown system 4B00 implements a computer implemented method for transparently interfacing an R client environment with a database engine environment. The method commences upon receiving an R language code fragment from the R client environment (see operation 402 and see operation 404). Then one or more operations are performed to interpret the R language code fragment in order to identify certain R language constructs that can be transformed and/or partitioned and/or mapped (see operation 408), and the results of such interpretation can be stored in a persistent storage area 410. Using a target system description 406, and the interpretation of the R language code fragments, the system 4B00 seeks to optimize a mapping, and seeks to exploit parallelism (see operation 412).

The act to optimize a mapping can include operations for determining the computation resource requirements of the subject R language constructs. The act to optimize a mapping can further comprise mapping to a database engine, or can comprise mapping to a remote execution engine. In the case of mapping to a remote execution engine (e.g., an embedded R language interpreter, an embedded R statistics package, an embedded R graphics engine, an embedded external database connectors, etc.), operations within the system 4B00 can determine at least one execution target for each subject R language construct. As shown, operations within the system 4B00 can spawn components, for example, one or more embedded R language interpreters (see operation 414) and/or can spawn one or more external database connectors (see operation 420).

The act to optimize a mapping can include determining computational resource requirements of the subject R language constructs, and a determination algorithm can consider a functional mapping, a database size estimation, and a computational demand assessment.

Figure 5:
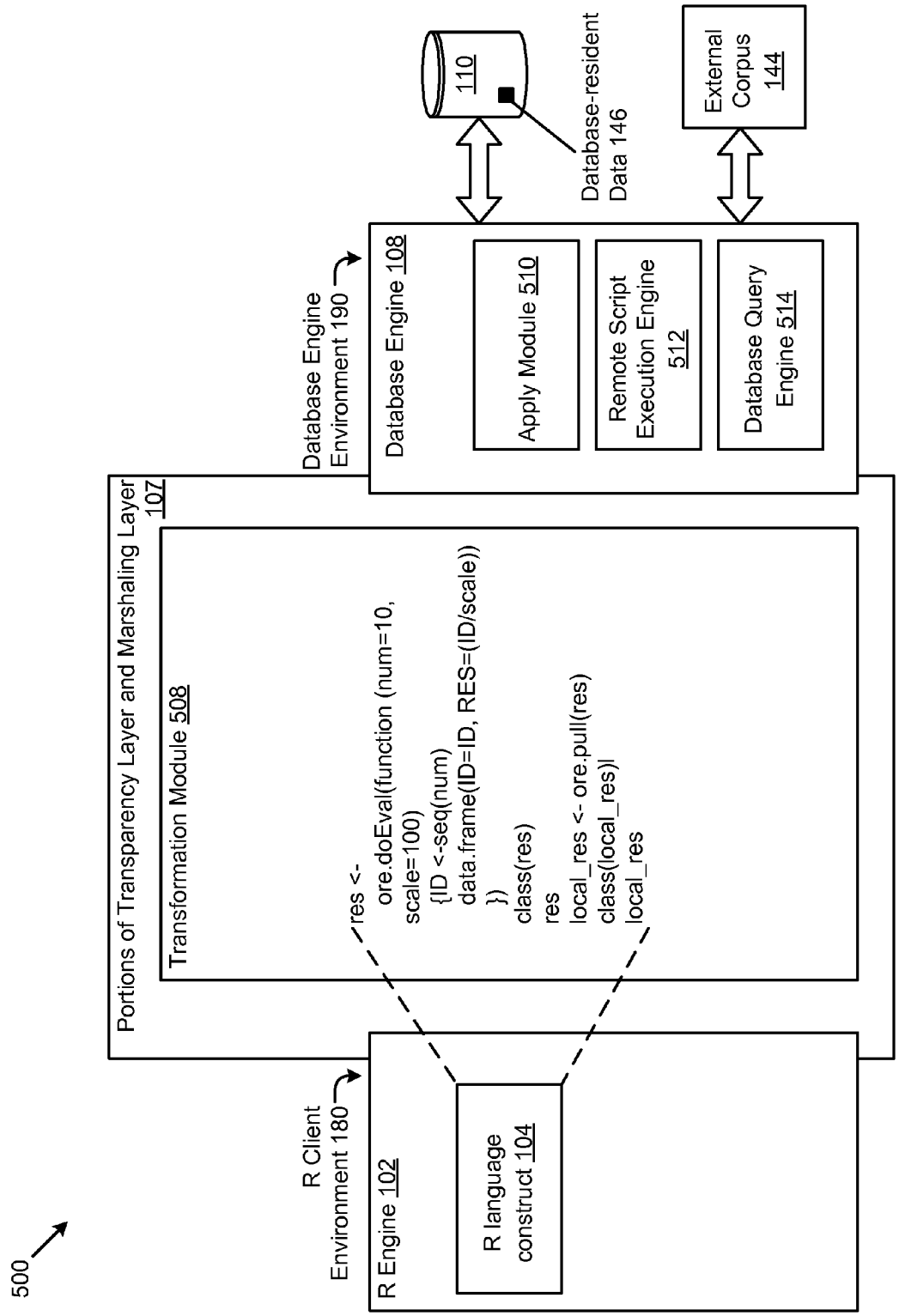
FIG. 5 is a system for remote execution of an R script when interfacing an R language client with a database engine, according to some embodiments.

FIG. 5 is a system 500 for remote execution of an R script when interfacing an R language client with a database engine. As an option, the present system 500 may be implemented in the context of the architecture and functionality of the embodiments described herein. Also, the system 500 or any aspect therein may be implemented in any desired environment.

There are certain cases where an R script is executed in a remote execution environment. More specifically, a transformation module 508 (e.g., for implementing transformation operations) can receive R language constructs in the form of R scripts, and transform or partition the R language scripts. In some cases a portion of the R script is sent to an apply module 510. In other cases a portion of the R script is sent to a remote script execution engine 512. In still other cases, a portion of the R script is sent to a database query engine 514. Any one or another portion a portion of the R script is sent to one or another engine. Table 2 gives a sample of R interface functions, and an exemplary purpose.

TABLE 2

| Embedded Script Execution - R Interface | |
|---|---|
| R Interface Function | Purpose |
| ore.doEval() | Invoke stand-alone R script |
| ore.tableApply() | Invoke R script with full table as input |
| ore.rowApply() | Invoke R script on one row at a time, or multiple rows in chunks |
| ore.groupApply() | Invoke R script on data partitioned by grouping column |
| ore.indexApply() | Invoke R script N times |
| ore.scriptCreate() | Create an R script in the database |
| ore.scriptDrop() | Drop an R script in the database |

It can be recognized that the security environment between an R client environment 180 and a database engine environment 190 may differ, and may even differ in such a way that many not facilitate reconciliation. Accordingly, the capabilities of the disclosed techniques for embedded R script execution comprises functions suited primarily for an administrative role (e.g., scriptCreate( ), scriptDrop( )), while running the scripts is primarily suited for a user role. As a convenience, a remote script call facility serves to interact with a script repository in the database so as to pass scripts by name to the ore.doEval( ) and other embedded script interface functions. Thus, a security environment can be created such that a user can confidently execute accessible scripts, knowing that the accessible scripts have been vetted by an administrator before being made accessible to the user roles.

Additional Embodiments of the Disclosure

Figure 6:
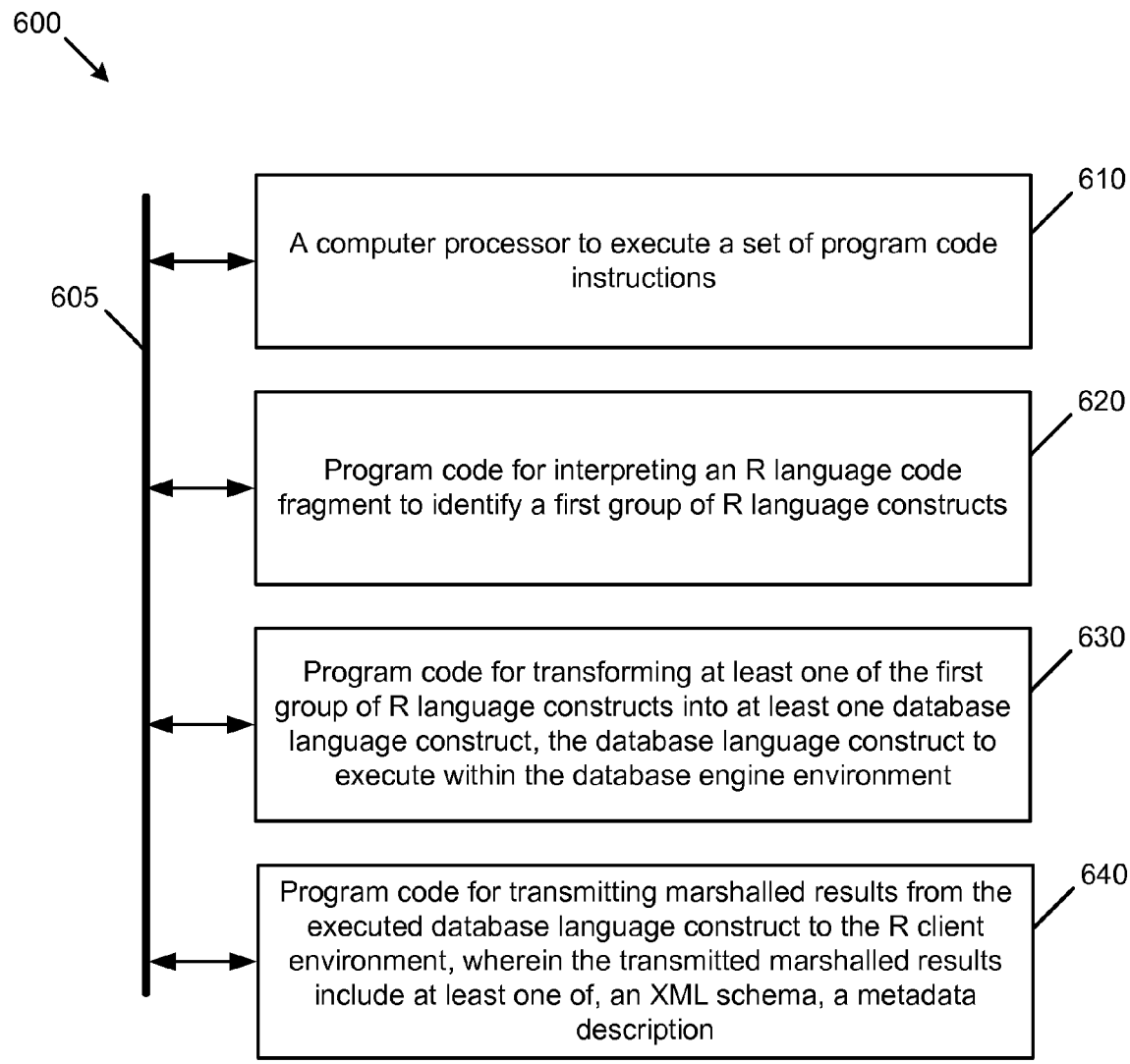
FIG. 6 depicts a block diagram of a system to perform certain functions of a computer system.

FIG. 6 depicts a block diagram of a system to perform certain functions of a computer system. As an option, the present system 600 may be implemented in the context of the architecture and functionality of the embodiments described herein. Of course, however, the system 600 or any operation therein may be carried out in any desired environment. As shown, system 600 comprises at least one processor and at least one memory, the memory serving to store program instructions corresponding to the operations of the system. As shown, an operation can be implemented in whole or in part using program instructions accessible by a module. The modules are connected to a communication path 605, and any operation can communicate with other operations over communication path 605. The modules of the system can, individually or in combination, perform method operations within system 600. Any operations performed within system 600 may be performed in any order unless as may be specified in the claims. The embodiment of FIG. 6 implements a portion of a computer system, shown as system 600, comprising a computer processor to execute a set of program code instructions (see module 610) and modules for accessing memory to hold program code instructions to perform: interpreting an R language code fragment to identify a first group of R language constructs (see module 620); transforming at least one of the first group of R language constructs into at least one database language construct, the database language construct to execute within the database engine environment (see module 630), and for transmitting marshalled results from the executed database language construct to the R client environment, wherein the transmitted marshalled results include at least one of, an XML schema, a metadata description (see module 640).

Figure 7:
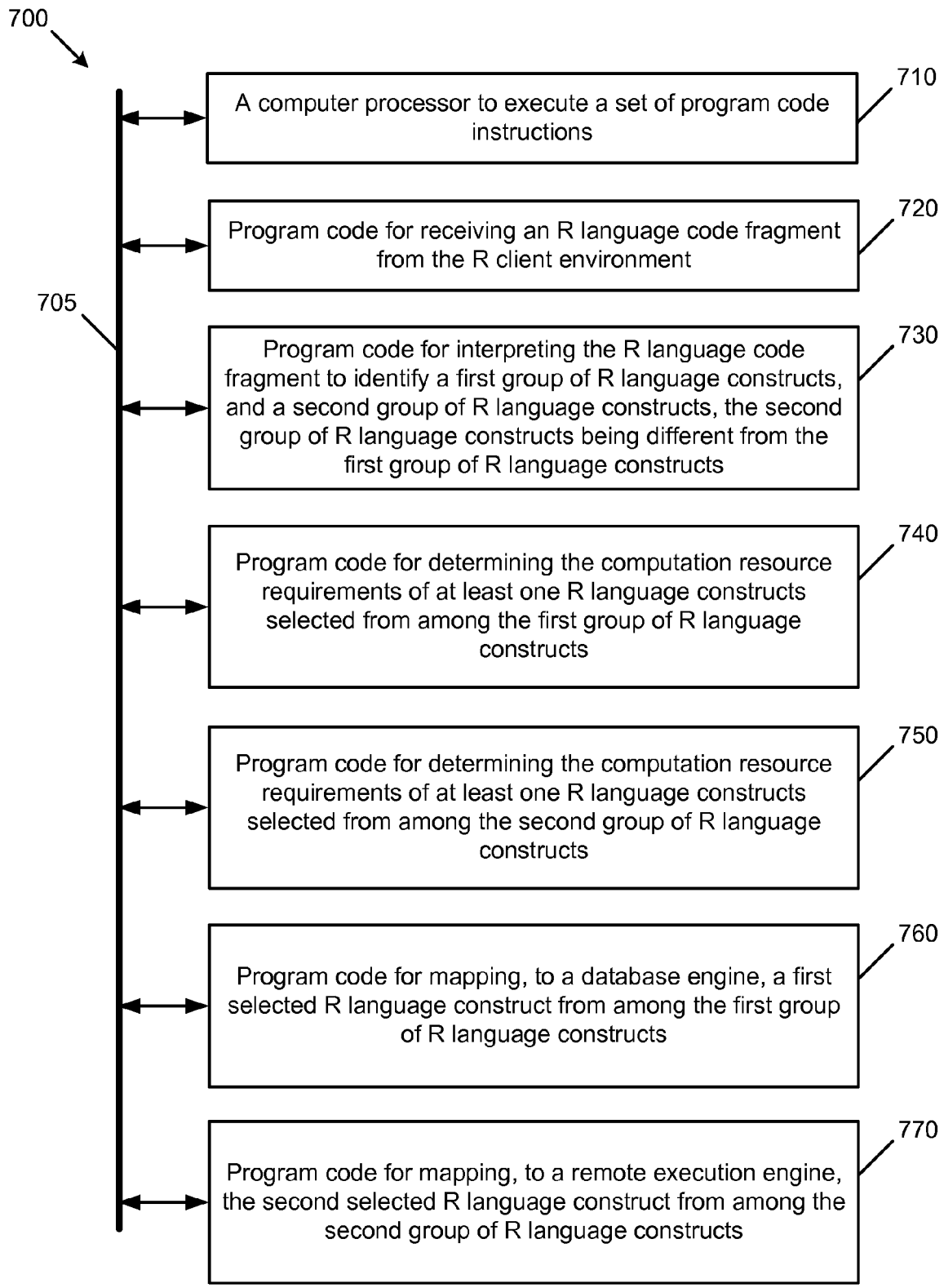
FIG. 7 depicts a block diagram of a system to perform certain functions of a computer system.

FIG. 7 depicts a block diagram of a system to perform certain functions of a computer system. As an option, the present system 700 may be implemented in the context of the architecture and functionality of the embodiments described herein. Of course, however, the system 700 or any operation therein may be carried out in any desired environment. As shown, system 700 comprises at least one processor and at least one memory, the memory serving to store program instructions corresponding to the operations of the system. As shown, an operation can be implemented in whole or in part using program instructions accessible by a module. The modules are connected to a communication path 705, and any operation can communicate with other operations over communication path 705. The modules of the system can, individually or in combination, perform method operations within system 700. Any operations performed within system 700 may be performed in any order unless as may be specified in the claims. The embodiment of FIG. 7 implements a portion of a computer system, shown as system 700, comprising a computer processor to execute a set of program code instructions (see module 710) and modules for accessing memory to hold program code instructions to perform: receiving an R language code fragment from the R client environment (see module 720); interpreting the R language code fragment to identify a first group of R language constructs, and a second group of R language constructs, the second group of R language constructs being different from the first group of R language constructs (see module 730); determining the computation resource requirements of at least one R language constructs selected from among the first group of R language constructs (see module 740); determining the computation resource requirements of at least one R language constructs selected from among the second group of R language constructs (see module 750); mapping, to a database engine, a first selected R language construct from among the first group of R language constructs (see module 760); and mapping, to a remote execution engine, the second selected R language construct from among the second group of R language constructs (see module 770).

System Architecture Overview

Figure 8:
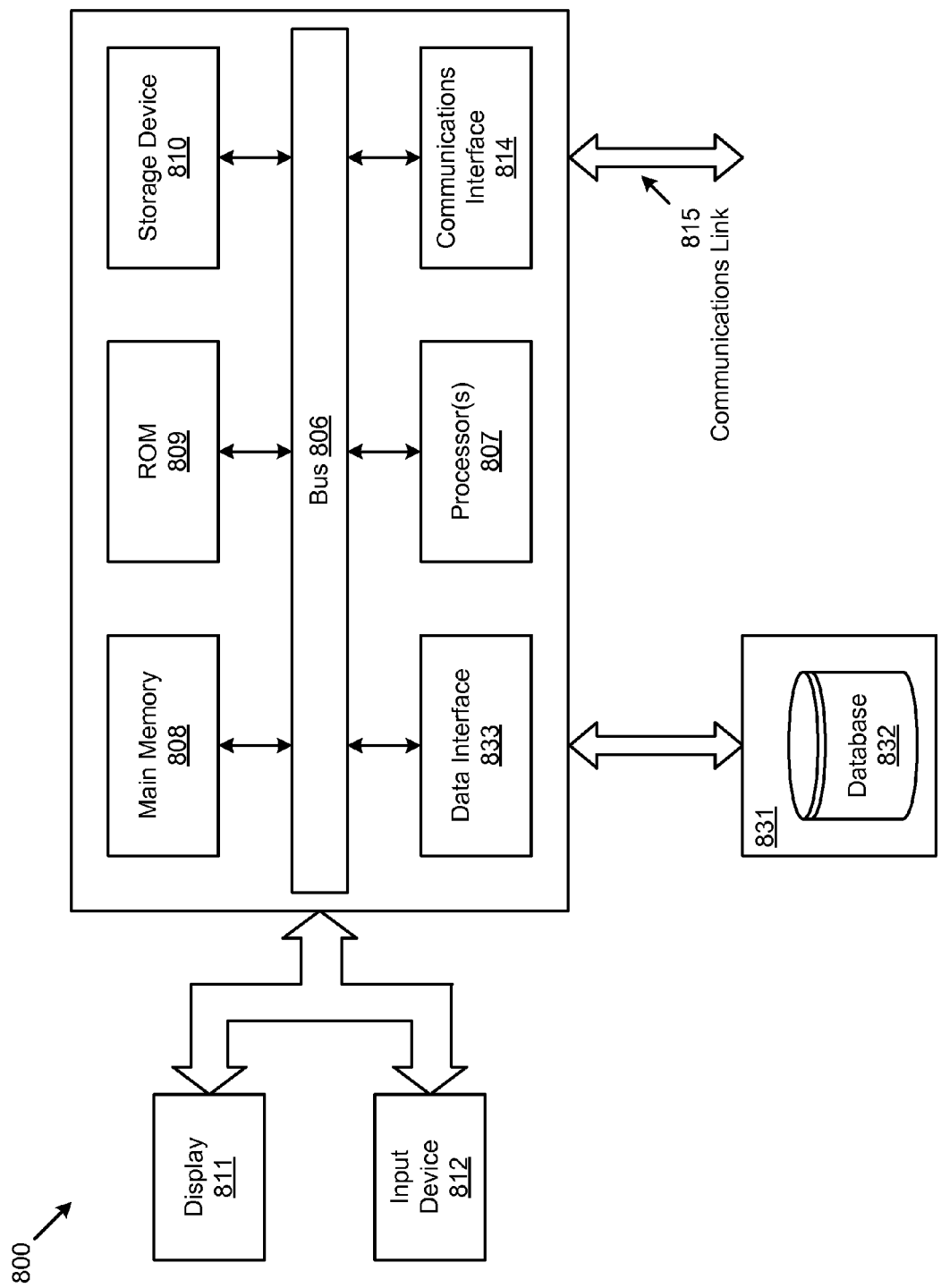
FIG. 8 depicts a block diagram of an instance of a computer system suitable for implementing an embodiment of the present disclosure.

FIG. 8 depicts a block diagram of an instance of a computer system 800 suitable for implementing an embodiment of the present disclosure. Computer system 800 includes a bus 806 or other communication mechanism for communicating information, which interconnects subsystems and devices, such as a processor 807, a system memory 808 (e.g., RAM), a static storage device (e.g., ROM 809), a disk drive 810 (e.g., magnetic or optical), a data interface 833, a communication interface 814 (e.g., modem or Ethernet card), a display 811 (e.g., CRT or LCD), input devices 812 (e.g., keyboard, cursor control), and an external data repository 831.

According to one embodiment of the disclosure, computer system 800 performs specific operations by processor 807 executing one or more sequences of one or more instructions contained in system memory 808. Such instructions may be read into system memory 808 from another computer readable/usable medium, such as a static storage device or a disk drive 810. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 807 for execution. Such a medium may take many forms, including but not limited to, non-volatile media and volatile media. Non-volatile media includes, for example, optical or magnetic disks, such as disk drive 810. Volatile media includes dynamic memory, such as system memory 808.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 800. According to other embodiments of the disclosure, two or more computer systems 800 coupled by a communication link 815 (e.g., LAN, PTSN, or wireless network) may perform the sequence of instructions required to practice the disclosure in coordination with one another.

Computer system 800 may transmit and receive messages, data, and instructions, including programs (e.g., application code), through communication link 815 and communication interface 814. Received program code may be executed by processor 807 as it is received, and/or stored in disk drive 810 or other non-volatile storage for later execution. Computer system 800 may communicate through a data interface 833 to a database 832 on an external data repository 831. A module as used herein can be implemented using any mix of any portions of the system memory 808, and any extent of hard-wired circuitry including hard-wired circuitry embodied as a processor 807.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than restrictive sense.

What is claimed is:

1. A computer implemented method for interfacing an R client environment with a separate database engine environment, the method comprising:
    interpreting, using a processor, an R language code fragment to identify a first group of R language constructs;
    mapping at least one of the first group of R language constructs to a schema; and
    transforming at least one of the first group of R language constructs into at least one database language construct using the schema, the database language construct to execute within the database engine environment.

2. The method of claim 1, further comprising transmitting marshalled results from an executed database language construct to the R client environment, wherein the transmitted marshalled results include at least one of an XML schema and a metadata description.

3. The method of claim 1, further comprising mapping at least one of the first group of R language constructs to execute within the R client environment, and executing the at least one of the first group of R language constructs within the R client environment.

4. The method of claim 1, further comprising mapping the least one database language construct to execute within the database engine environment, and executing the at least one database language construct within the database engine environment.

5. The method of claim 1, wherein the database engine environment comprises an external database connector.

6. The method of claim 5, wherein the external database connector connects to an external data appliance.

7. The method of claim 1, further comprising spawning, to execute within the database engine environment, at least one R engine component, the at least one R engine component selected from R engine components comprising the R client environment.

8. The method of claim 1, further comprising interpreting the R language code fragment to identify a second group of R language constructs, the second group of R language constructs depending from the first group of R language constructs.

9. A computer system for interfacing an R client environment with a separate database engine environment, comprising:
a computer processor to execute a set of program code instructions; and
a memory to hold the program code instructions, in which the program code instructions comprises program code to perform,
interpreting, using a processor, an R language code fragment to identify a first group of R language constructs;
mapping at least one of the first group of R language constructs to a schema; and
transforming at least one of the first group of R language constructs into at least one database language construct using the schema, the database language construct to execute within the database engine environment.

10. The computer system of claim 9, further comprising code to perform transmitting marshalled results from an executed database language construct to the R client environment, wherein the transmitted marshalled results include at least one of an XML schema and a metadata description.

11. The computer system of claim 9, further comprising code to perform mapping at least one of the first group of R language constructs to execute within the R client environment, and executing the at least one of the first group of R language constructs within the R client environment.

12. The computer system of claim 9, further comprising code to perform mapping the least one database language construct to execute within the database engine environment, and executing the at least one database language construct within the database engine environment.

13. The computer system of claim 9, wherein the database engine environment comprises an external database connector.

14. The computer system of claim 13, wherein the external database connector connects to an external data appliance.

15. The computer system of claim 9, further comprising code to perform spawning, executed within the database engine environment, at least one R engine component, the at least one R engine component selected from R engine components comprising the R client environment.

16. The computer system of claim 9, further comprising code to perform interpretion of the R language code fragment to identify a second group of R language constructs, the second group of R language constructs depending from the first group of R language constructs.

17. A computer program product embodied in a non-transitory computer readable medium, the computer readable medium having stored thereon a sequence of instructions which, when executed by a processor causes the processor to execute a process to implement interfacing an R client environment with a separate database engine environment, the process comprising:
interpreting an R language code fragment to identify a first group of R language constructs;
mapping at least one of the first group of R language constructs to a schema; and
transforming at least one of the first group of R language constructs into at least one database language construct using the schema, the database language construct to execute within the database engine environment.

18. The computer program product of claim 17, further comprising instructions, which when executed causes the processor to implement the process of, transmitting marshalled results from an executed database language construct to the R client environment, wherein the transmitted marshalled results include at least one of an XML schema and a metadata description.

19. The computer program product of claim 17, further comprising instructions, which when executed causes the processor to implement the process of, mapping at least one of the first group of R language constructs to execute within the R client environment, and executing the at least one of the first group of R language constructs within the R client environment.

20. The computer program product of claim 17, further comprising instructions, which when executed causes the processor to implement the process of, mapping the least one database language construct to execute within the database engine environment, and executing the at least one database language construct within the database engine environment.

21. A computer implemented method for transparently interfacing an R client environment with a separate database engine environment, the method comprising:
receiving an R language code fragment from the R client environment;
interpreting the R language code fragment to identify a first group of R language constructs, and a second group of R language constructs, the second group of R language constructs being different from the first group of R language constructs;
determining the computation resource requirements of at least one R language constructs selected from among the first group of R language constructs;
determining the computation resource requirements of at least one R language constructs selected from among the second group of R language constructs;
mapping, to a database engine, a first selected R language construct from among the first group of R language constructs; and
mapping, to a remote execution engine, the second selected R language construct from among the second group of R language constructs.

22. The method of claim 21, wherein the computation resource requirements of at least one of the R language constructs selected from among the first group of R language constructs comprises at least one of, a functional mapping, a database size estimation, and a computational demand assessment.

23. The method of claim 21, wherein the computation resource requirements of at least one of the R language constructs selected from among the second group of R language constructs comprises at least one of, a functional mapping, a database size estimation, and a computational demand assessment.

24. The method of claim 21, further comprising executing the first selected R language construct on the database engine.

25. The method of claim 24, further comprising transmitting marshalled results, the marshalled results depending at least in part from the act of executing the first selected R language construct.

26. The method of claim 25, wherein the transmitted marshalled results include a metadata description.

27. The method of claim 21, further comprising:
processing at least one of the R language constructs selected from among the first group of R language constructs to generate a corresponding query without executing it; and
executing the corresponding query only when the result of the query is to be displayed in a tabular or graphical form in the R client environment.

28. A computer system for interfacing an R client environment with a separate database engine environment, comprising:
a computer processor to execute a set of program code instructions; and
a memory to hold the program code instructions, in which the program code instructions comprises program code to perform,
receiving an R language code fragment from the R client environment;
interpreting the R language code fragment to identify a first group of R language constructs, and a second group of R language constructs, the second group of R language constructs being different from the first group of R language constructs;
determining computation resource requirements of at least one R language constructs selected from among the first group of R language constructs;
determining computation resource requirements of at least one R language constructs selected from among the second group of R language constructs;
mapping, to a database engine, a first selected R language construct from among the first group of R language constructs; and
mapping, to a remote execution engine, the second selected R language construct from among the second group of R language constructs.

29. The computer system of claim 28, wherein the computed resource requirements of at least one of the R language constructs selected from among the first group of R language constructs comprises at least one of, a functional mapping, a database size estimation, and a computational demand assessment.

30. The computer system of claim 28, wherein the computed resource requirements of at least one of the R language constructs selected from among the second group of R language constructs comprises at least one of, a functional mapping, a database size estimation, and a computational demand assessment.

31. The computer system of claim 28, further comprising program code to perform the process of, executing the first selected R language construct on the database engine.

32. The computer system of claim 30, further comprising program code to perform the process of, transmitting marshaled results, the marshalled results depending at least in part from the act of executing the first selected R language construct.

33. The computer system of claim 28, further comprising program code to perform the process of: processing a least one from among the first group of R language constructs to generate a corresponding query without executing it; and executing the corresponding query only when the result of the query is to be displayed in a tabular or graphical form in the R client environment.

34. A computer program product embodied in a non-transitory computer readable medium, the computer readable medium having stored thereon a sequence of instructions which, when executed by a processor causes the processor to execute a process to implement interfacing an R client environment with a separate database engine environment, the process comprising:
receiving an R language code fragment from the R client environment;
interpreting the R language code fragment to identify a first group of R language constructs, and a second group of R language constructs, the second group of R language constructs being different from the first group of R language constructs;
determining the computation resource requirements of at least one R language constructs selected from among the first group of R language constructs;
determining the computation resource requirements of at least one R language constructs selected from among the second group of R language constructs;
mapping, to a database engine, a first selected R language construct from among the first group of R language constructs; and
mapping, to a remote execution engine, the second selected R language construct from among the second group of R language constructs.

35. The computer program product of claim 34, wherein the computed resource requirements of at least one of the R language constructs selected from among the first group of R language constructs comprises at least one of, a functional mapping, a database size estimation, and a computational demand assessment.

36. The computer program product of claim 34, wherein the computed resource requirements of at least one of the R language constructs selected from among the second group of R language constructs comprises at least one of, a functional mapping, a database size estimation, and a computational demand assessment.

37. The computer program product of claim 34, further comprising a sequence of instructions which, when executed by a processor causes the processor to execute a process to execute the first selected R language construct on the database engine.

38. The computer program product of claim 37, further comprising a sequence of instructions which, when executed by a processor causes the processor to execute a process to transmit marshalled results, the marshalled results depending at least in part from the act of executing the first selected R language construct.

39. The computer program product of claim 38, wherein the transmitted marshaled results include a metadata description.

40. The computer program product of claim 38, further comprising:
processing a least one of the R language constructs selected from among the first group of R language constructs to generate a corresponding query without executing it; and
executing the corresponding query only when the result is to be displayed in a tabular or graphical form in the R client environment.

* * * * *

UNITED STATES PATENT AND TRADEMARK OFFICE
CERTIFICATE OF CORRECTION

PATENT NO. : 9,043,368 B2  
APPLICATION NO. : 13/434479  
DATED : May 26, 2015  
INVENTOR(S) : Mukhin et al.

Page 1 of 1

It is certified that error appears in the above-identified patent and that said Letters Patent is hereby corrected as shown below:

In drawings, on sheet 16 of 19, in figure 5, under Reference Numeral 107, line 1, delete "Marshaling" and insert -- Marshalling --, therefor.

In the specification,

In column 10, line 29, delete "PRE D," and insert -- PRED, --, therefor.

In column 11, line 24, delete "marshallling" and insert -- marshalling --, therefor.

In column 14, line 42, delete "Haenzel" and insert -- Haenszel --, therefor.

In the claims,

In column 19, line 60, in Claim 16, delete "interpretion" and insert -- interpretation --, therefor.

Signed and Sealed this  
Ninth Day of February, 2016

Michelle K. Lee  
*Director of the United States Patent and Trademark Office*